US012130421B2

(12) United States Patent
Peters et al.

(10) Patent No.: US 12,130,421 B2
(45) Date of Patent: Oct. 29, 2024

(54) FOLDING SMARTPHONE ADAPTER FOR IMAGING THROUGH OPTICAL DEVICES

(71) Applicant: Celestron Acquisition, LLC, Torrance, CA (US)

(72) Inventors: Ron Peters, Long Beach, CA (US); Joseph Garrison, Orange, CA (US); Yunxing Ma, Gardena, CA (US); Corey Lee, Rancho Palos Verdes, CA (US)

(73) Assignee: Celestron Acquisition, LLC, Torrance, CA (US)

( * ) Notice: Subject to any disclaimer, the term of this patent is extended or adjusted under 35 U.S.C. 154(b) by 98 days.

(21) Appl. No.: 17/732,364

(22) Filed: Apr. 28, 2022

(65) Prior Publication Data
US 2023/0350188 A1    Nov. 2, 2023

(51) Int. Cl.
*G02B 23/24* (2006.01)
*H04M 1/02* (2006.01)
*H04M 1/72409* (2021.01)

(52) U.S. Cl.
CPC ...... *G02B 23/2484* (2013.01); *H04M 1/0264* (2013.01); *H04M 1/72409* (2021.01)

(58) Field of Classification Search
CPC ............ G02B 23/2484; H04M 1/0264; H04M 1/72409
See application file for complete search history.

(56) References Cited

U.S. PATENT DOCUMENTS

| | | | | |
|---|---|---|---|---|
| 2013/0331148 A1* | 12/2013 | Brough | ................. | G06F 1/1632 455/557 |
| 2016/0051142 A1* | 2/2016 | Howes | ..................... | A61B 3/14 351/245 |
| 2016/0097968 A1* | 4/2016 | Hunt | .................... | G03B 17/565 396/530 |
| 2016/0294996 A1* | 10/2016 | Yen | ........................ | H04M 1/04 |
| 2019/0302443 A1* | 10/2019 | Garrison | .............. | G03B 17/566 |

FOREIGN PATENT DOCUMENTS

| | | | |
|---|---|---|---|
| CN | 206060874 U | * | 3/2017 |
| CN | 210954568 U | * | 7/2020 |

* cited by examiner

*Primary Examiner* — Michael Lee
(74) *Attorney, Agent, or Firm* — Raubvogel Law Office

(57) ABSTRACT

An adapter may be used to couple an imaging device, such as a smartphone, to an optical device such as a telescope. The adapter may have an optical device mounting feature that mounts the adapter to the optical device, an imaging device mounting feature that mounts the imaging device to the adapter, and a positioning mechanism that adjustably positions the imaging device mounting feature relative to the optical device mounting feature. The adapter may also have a joint, distinct from the positioning mechanism, configured to move the optical device mounting feature between a stowed (e.g., "folded") configuration, in which the optical device mounting feature is positioned alongside the imaging device support surface, and a deployed (e.g., "unfolded") configuration, in which a camera of the imaging device is positionable, using positioning mechanism, in alignment with the optical device mounting feature with the imaging device mounted on the imaging device mounting feature.

16 Claims, 23 Drawing Sheets

FOLDING SMARTPHONE ADAPTER FOR IMAGING THROUGH OPTICAL DEVICES

TECHNICAL FIELD

The present document relates to systems and methods for coupling an imaging system, such as a smartphone, to an optical device so as to allow image capture through the optical device.

BACKGROUND

Many people enjoy viewing objects through optical devices made for distant viewing, such as telescopes, binoculars, and the like. Such optical devices can make it possible to view distant objects as though they were much closer to the user's position. Other optical devices, such as microscopes, are made for magnifying closer objects, and may be used for recreational or commercial purposes. In many instances, a user may want to capture the image viewed through the optical device.

Some devices exist that are made to help couple smartphones to optical devices. Many of these are bulky and thus, difficult to transport. The size of known smartphone attachment devices makes them inconvenient to transport, therefore reducing the likelihood that the user will have the device available when there is a need to capture images using the device.

SUMMARY

The present disclosure describes an adapter for connecting an imaging device, such as a smartphone, to an optical device, such as a telescope. Although this description is focused on attachment of a smartphone to a telescope, those of skill in the art will readily recognize that the features and steps described herein can be readily applied to different optical devices and/or imaging devices.

In some embodiments, an adapter for coupling an imaging device to an optical device may have an optical device mounting feature configured to mount the adapter to the optical device, an imaging device support surface, an imaging device mounting feature configured to mount an imaging device on the imaging device support surface, a positioning mechanism that adjustably positions the imaging device mounting feature, relative to the optical device mounting feature, along at least an X-axis parallel to the imaging device support surface, and a joint, distinct from the positioning mechanism. The joint may be configured to move the optical device mounting feature between a stowed (e.g., "folded") configuration, in which the optical device mounting feature is positioned alongside the imaging device support surface, and a deployed (e.g., "unfolded") configuration, in which a camera of the imaging device is positionable, with the positioning mechanism, in alignment with the optical device mounting feature with the imaging device mounted on the imaging device mounting feature.

The positioning mechanism may be actuated to move the imaging device along a Y-axis perpendicular to the X-axis and parallel to the imaging device supporting surface. The positioning mechanism may be further actuated to move the imaging device along a Z-axis perpendicular to the Y-axis and the X-axis.

The positioning mechanism may have an X-axis rack, an X-axis pinion coupled to the X-axis rack such that rotation of the X-axis pinion causes translation of the X-axis rack along the X-axis, an X-axis actuation interface coupled to the X-axis pinion such that manual rotation of the X-axis actuation interface causes rotation of the X-axis pinion, a Y-axis rack, a Y-axis pinion coupled to the Y-axis rack such that rotation of the Y-axis pinion causes translation of the Y-axis rack along the Y-axis, and a Y-axis actuation interface coupled to the Y-axis pinion such that manual rotation of the Y-axis actuation interface causes rotation of the Y-axis pinion.

The optical device mounting feature may have a first arm and a second arm that is translatable relative to the first arm to clamp a portion of the optical device between the first arm and the second arm.

The optical device mounting feature may further have a threaded shaft coupled to the second arm to urge the second arm to move toward or away from the first arm in response to rotation of the threaded shaft.

The joint may be a pin joint that enables the optical device mounting feature to rotate relative to the imaging device support surface.

The pin joint may have a pin, parallel to the imaging device support surface, about which the optical device mounting feature is rotatable relative to the imaging device support surface.

The adapter may further have a deployed configuration latch that can be actuated between a free position, in which the optical device mounting feature is freely movable from the deployed configuration to the stowed configuration, and a locked position, in which the optical device mounting feature is locked in the deployed configuration.

The deployed configuration latch may have a recess, a protrusion sized to be received in the recess, and a slot within which the pin is translatable to translate the protrusion into the recess to retain the optical device mounting feature in the deployed configuration.

The adapter may further have a stowed configuration latch that can be actuated between a free position, in which the optical device mounting feature is freely movable from the stowed configuration to the deployed configuration, and a locked position, in which the optical device mounting feature is locked in the stowed configuration.

In some embodiments, an adapter for coupling an imaging device to an optical device may have an optical device mounting feature configured to mount the adapter to the optical device, an imaging device support surface, an imaging device mounting feature configured to mount an imaging device on the imaging device support surface, and a joint. The joint may be configured to rotate the optical device mounting feature between a stowed configuration, in which the optical device mounting feature is positioned alongside the imaging device support surface; and a deployed configuration, in which the optical device mounting feature extends beyond a profile of the imaging device support surface.

The optical device mounting feature may include a first arm, a second arm, and a threaded shaft coupled to the second arm to urge the second arm to translate toward the first arm in response to rotation of the threaded shaft to clamp a portion of the optical device between the first arm and the second arm.

The joint may be a pin joint comprising a pin, parallel to the imaging device support surface, about which the optical device mounting feature is rotatable relative to the imaging device support surface.

The adapter may further have a deployed configuration latch that can be actuated between a free position, in which the optical device mounting feature is freely movable from the deployed configuration to the stowed configuration, and a locked position, in which the optical device mounting feature is locked in the deployed configuration.

The deployed configuration latch may have a recess, a protrusion sized to be received in the recess, and a slot within which the pin is translatable to translate the protrusion into the recess to retain the optical device mounting feature in the deployed configuration.

The adapter may further have a stowed configuration latch that can be actuated between a free position, in which the optical device mounting feature is freely movable from the stowed configuration to the deployed configuration, and a locked position, in which the optical device mounting feature is locked in the stowed configuration.

According to some embodiments, a method may be used to couple an imaging device to an optical device with an adapter having an optical device mounting feature, an imaging device support surface, an imaging device mounting feature, and a joint. The method may include actuating the joint to rotate the optical device mounting feature from a stowed configuration, in which the optical device mounting feature is positioned alongside the imaging device support surface, to a deployed configuration, in which the optical device mounting feature extends beyond a profile of the imaging device support surface. The method may further include, with the optical device mounting feature, mounting the adapter to the optical device. Further, the method may include, with the imaging device mounting feature, mounting an imaging device to the adapter. The method may yet further include, with the joint in the deployed configuration, aligning the optical device with a camera of the imaging device.

The adapter may further have a positioning mechanism. Aligning the optical device with the camera may include adjusting the imaging device mounting feature, relative to the imaging device support surface, along at least an X-axis parallel to the imaging device support surface.

Aligning the optical device with the camera may further include adjusting the imaging device mounting feature, relative to the imaging device support surface, along a Y-axis perpendicular to the X-axis and parallel to the imaging device supporting surface.

The positioning mechanism may include an X-axis rack, an X-axis pinion coupled to the X-axis rack, an X-axis actuation interface coupled to the X-axis pinion, a Y-axis rack, a Y-axis pinion coupled to the Y-axis rack, and a Y-axis actuation interface coupled to the Y-axis pinion. Adjusting the imaging device mounting feature along the X-axis may include manually rotating the X-axis actuation interface to cause rotation of the X-axis pinion to cause translation of the X-axis rack along the X-axis. Adjusting the imaging device mounting feature along the Y-axis may include manually rotating the Y-axis actuation interface to cause rotation of the Y-axis pinion to cause translation of the Y-axis rack along the Y-axis.

The optical device mounting feature may have a first arm, a second arm, and a threaded shaft coupled to the second arm. Mounting the adapter to the optical device may include rotating the threaded shaft to urge the second arm to translate toward the first arm in response to rotation of the threaded shaft to clamp a portion of the optical device between the first arm and the second arm.

The joint may include a pin, parallel to the imaging device support surface. Actuating the joint may include rotating the optical device mounting feature about the pin.

The adapter may further include a deployed configuration latch. The method may further include, after moving the joint to the deployed configuration, actuating the deployed configuration latch from a free position, in which the optical device mounting feature is freely movable from the deployed configuration to the stowed configuration, to a locked position, in which the optical device mounting feature is locked in the deployed configuration.

The deployed configuration latch may have a recess, a protrusion sized to be received in the recess, and a slot. Actuating the deployed configuration latch from the free position to the locked position may include translating the pin in the slot to translate the protrusion into the recess to retain the optical device mounting feature in the deployed configuration.

The adapter may further include a stowed configuration latch. The method may further include, prior to moving the joint to the deployed configuration, actuating the stowed configuration latch from a locked position, in which the optical device mounting feature is locked in the stowed configuration, to a free position, in which the optical device mounting feature is freely movable from the stowed configuration to the deployed configuration.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

The techniques described herein can be used in connection with any type of optical device, including for example telescopes, spotting scopes, rifle scopes, monoculars, binoculars, and microscopes.

In at least one embodiment, the described adapter includes an imaging device mounting feature in the form of a holder that holds the smartphone against an imaging device support surface, and an optical device mounting feature in the form of a clamping device that attaches to the eyepiece section of the optical device, which may be a telescope. The clamping device may have a screw-driven second arm that can be advanced to clamp the eyepiece against a first arm. This mounting system may ensure a firm connection of the adapter onto the optical device, thereby preventing any movement of the smartphone relative to the optical device.

The adapter may have two adjustment knobs that connect to rack-and-pinion gears for precise X-axis and Y-axis positioning of the smartphone's camera relative to the telescope's eyepiece.

The adapter may further have a joint that permits the adapter to move between a stowed (e.g., "folded") configuration and a deployed (e.g., "unfolded") configuration. In the stowed configuration, the optical device mounting feature may reside alongside the imaging device support surface. In the deployed configuration, the optical device mounting feature may extend beyond the profile of the imaging device support surface so that the camera of the imaging device can be aligned with the eyepiece, with the eyepiece mounted on the optical device mounting feature. Thus, the adapter may be stored and transported in a more compact form. A stowed configuration latch and a deployed configuration latch may be used to keep the adapter in the stowed configuration and the deployed configuration, respectively, until the user unlocks the latch to use the joint.

Exemplary System Including Optical and Imaging Devices

Figure 1:
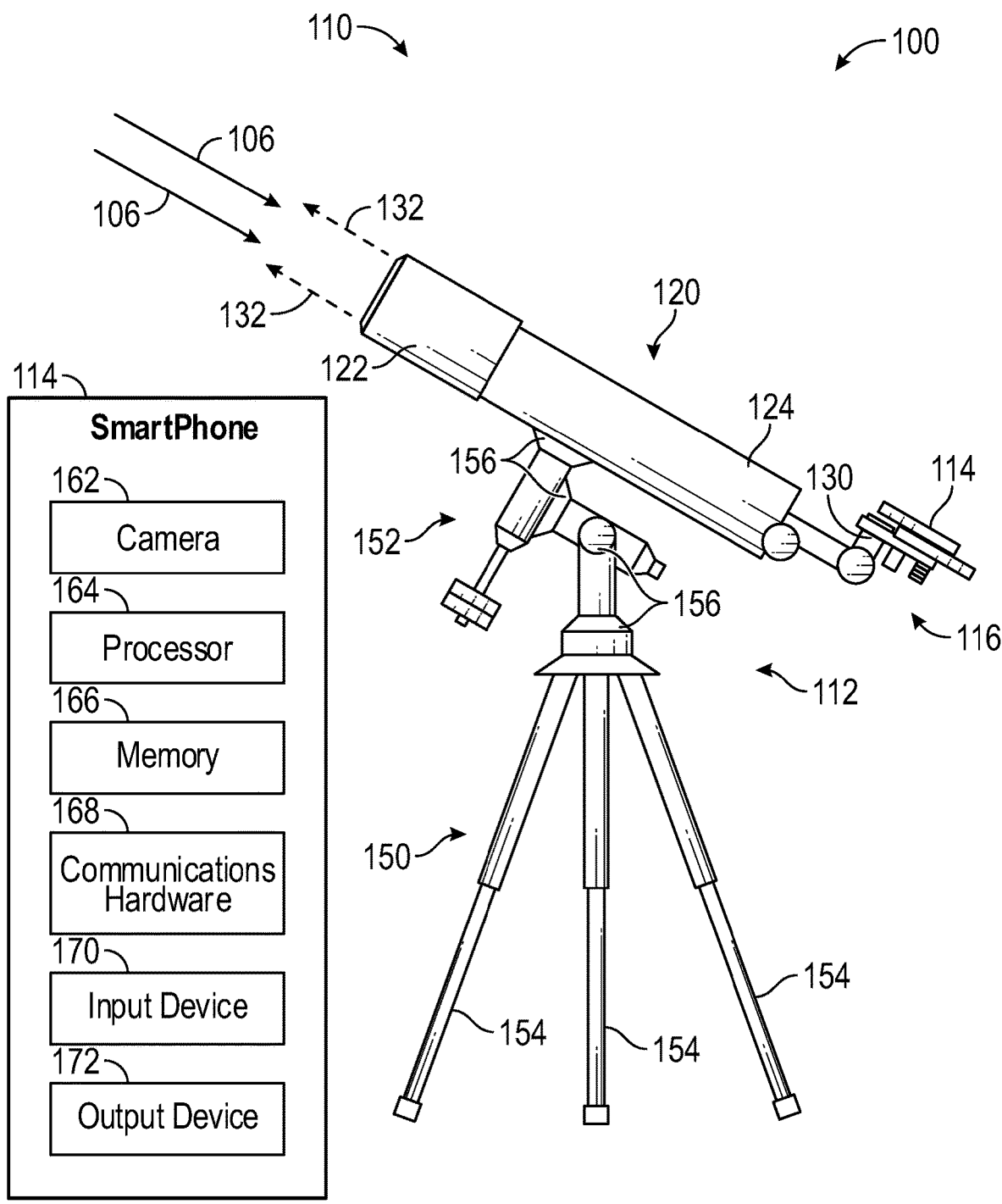
FIG. 1 is a side elevation view of system including an optical device in the form of a telescope, according to one embodiment.

Referring to FIG. 1, a side elevation view depicts a system 100 including an optical device in the form of a telescope 110, according to one embodiment. In this application, an "optical device" may be any device that is designed to direct, capture, or otherwise manipulate light for viewing by a user. Thus, optical devices may include telescopes, binoculars, monoculars, periscopes, cameras, lens attachments, microscopes, and/or any other device that utilizes lenses, mirrors, and/or prisms to manipulate light.

In the system 100 of FIG. 1, the optical device is a telescope 110, as shown. The telescope 110 may receive light 106, which may be extraterrestrial light and/or light from any other source, and may be used to provide the user with a view of the subject.

As shown, the system 100 may include multiple exemplary components. Such components may include, but need not be limited to, the telescope 110, a support 112, and an imaging device, which may take the form of a smartphone 114. In alternative embodiments, an imaging device need not be a smartphone, but may instead be any other device for capturing still and/or video imagery, such as a tablet, phablet, digital camera, film-based camera, video camera, and/or the like.

The telescope 110 may, in certain embodiments, be used to view far-away objects, such as extraterrestrial objects. In other embodiments, the telescope 110 may be used to view nearer, terrestrial objects. The telescope 110 may be supported by the support 112 at an orientation suitable for viewing and/or photographing the subject. The support 112 may facilitate orientation of the telescope 110 to point at the subject. In some embodiments, the support 112 may provide two-axis adjustment (for example, azimuth and elevation) of the orientation of the telescope 110.

The smartphone 114 may optionally be coupled to the telescope 110 with an adapter 116 to capture a view of the subject, as provided by the telescope 110. Optionally, the smartphone 114 may be used to capture images of such extraterrestrial or terrestrial subject matter, through the capture of light received by the telescope 110. In effect, the telescope 110 may act as a lens system for the smartphone 114.

As shown, the telescope 110 may have a housing 120, which may have a generally tubular shape as shown, or in alternative embodiments, another suitable shape such as a square or rectangular cross-sectional shape. The housing 120 may be sized to provide the desired aperture size so that the telescope 110 can capture sufficient light to generate bright, clear images with little vignetting, within a relatively short exposure period.

The housing 120 may have an aperture end 122 and a viewing end 124. The aperture end 122 may be oriented toward the subject matter to be viewed and/or imaged. Proximate the viewing end 124, the telescope 110 may have an eyepiece 130 coupled to the viewing end 124 of the housing 120. The eyepiece 130 may be designed such that an image of the light 106 captured by the telescope 110 is focused at the eyepiece 130. Thus, the user may view and/or capture the image through the eyepiece 130. The telescope 110 may have a field-of-view 132.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to change the orientation of the telescope 110 relative to the support 112. The telescope mounting portion 152 may have one or more mounting features that mate with and/or are otherwise secured to the telescope 110, for example, via attachment to an accessory mount (not shown) or other support attachment feature of the telescope 110.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors and/or other motors that provide fine control and locking capability may be used. Such motors may, if desired, be electronically controlled.

The smartphone 114 may have a camera 162, a processor 164, memory 166, communications hardware 168, and/or other electronics that enable the smartphone 114 to run apps that facilitate image capture and/or other functions. The smartphone 114 may also have an input device 170 and an output device 172 designed to receive input from and provide output to a user, respectively. In some embodiments, the input device 170 and the output device 172 may be integrated, for example, in the form of a touch screen.

The smartphone 114 may advantageously be coupled to the telescope 110 in a secure, yet adjustable manner. The adapter 116 may be made to accomplish this, as shown and described in greater detail herein.

Exemplary Adapter

Figure 2:
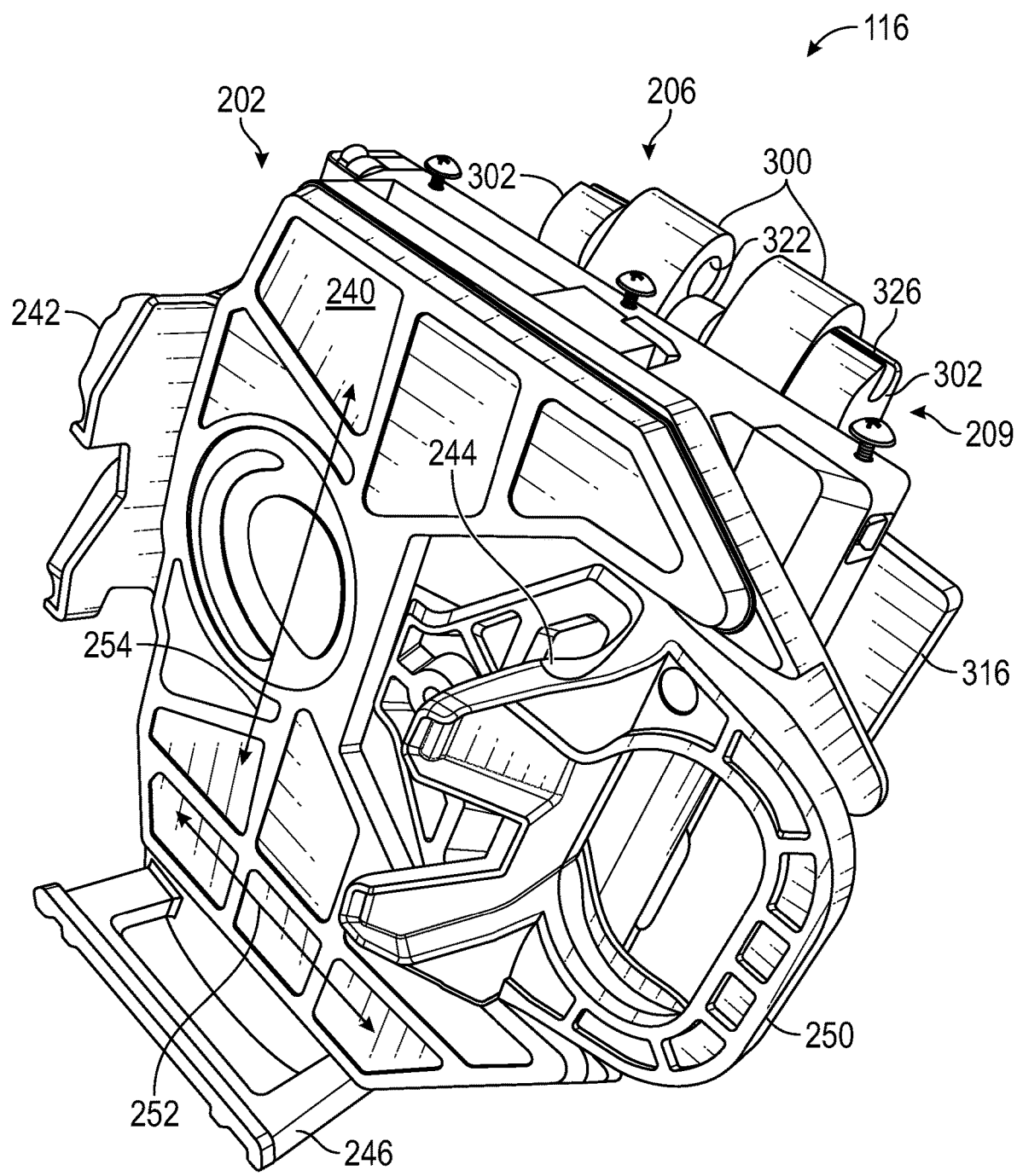
FIGS. 2 and 3 are front and rear perspective views, respectively, of the adapter 116 of FIG. 1, in a stowed (e.g., "folded") configuration according to one embodiment.
Figure 3:
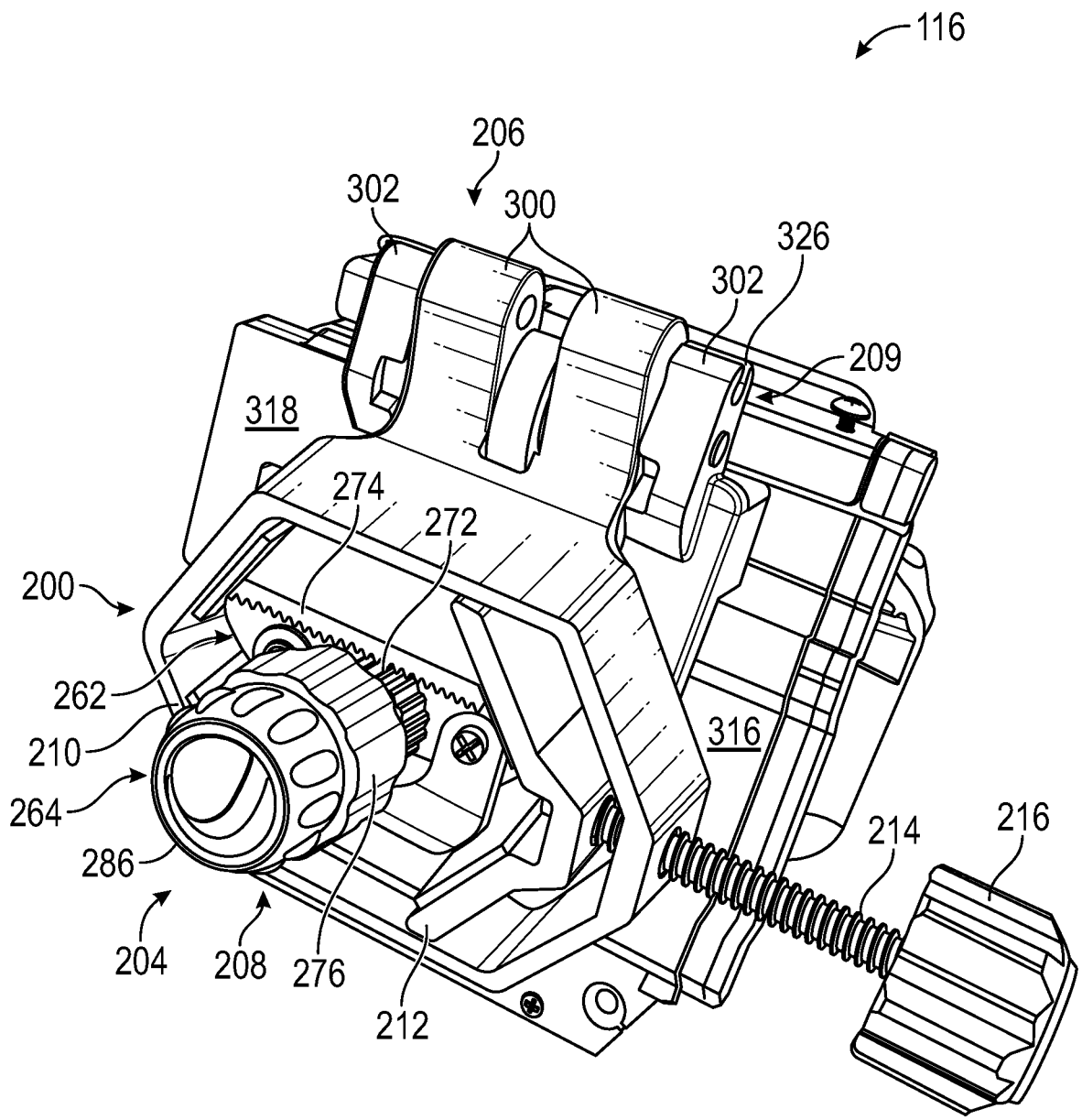

FIGS. 2 and 3 are front and rear perspective views, respectively, of the adapter 116 of FIG. 1, in a stowed (e.g., "folded") configuration according to one embodiment.

Figure 4:
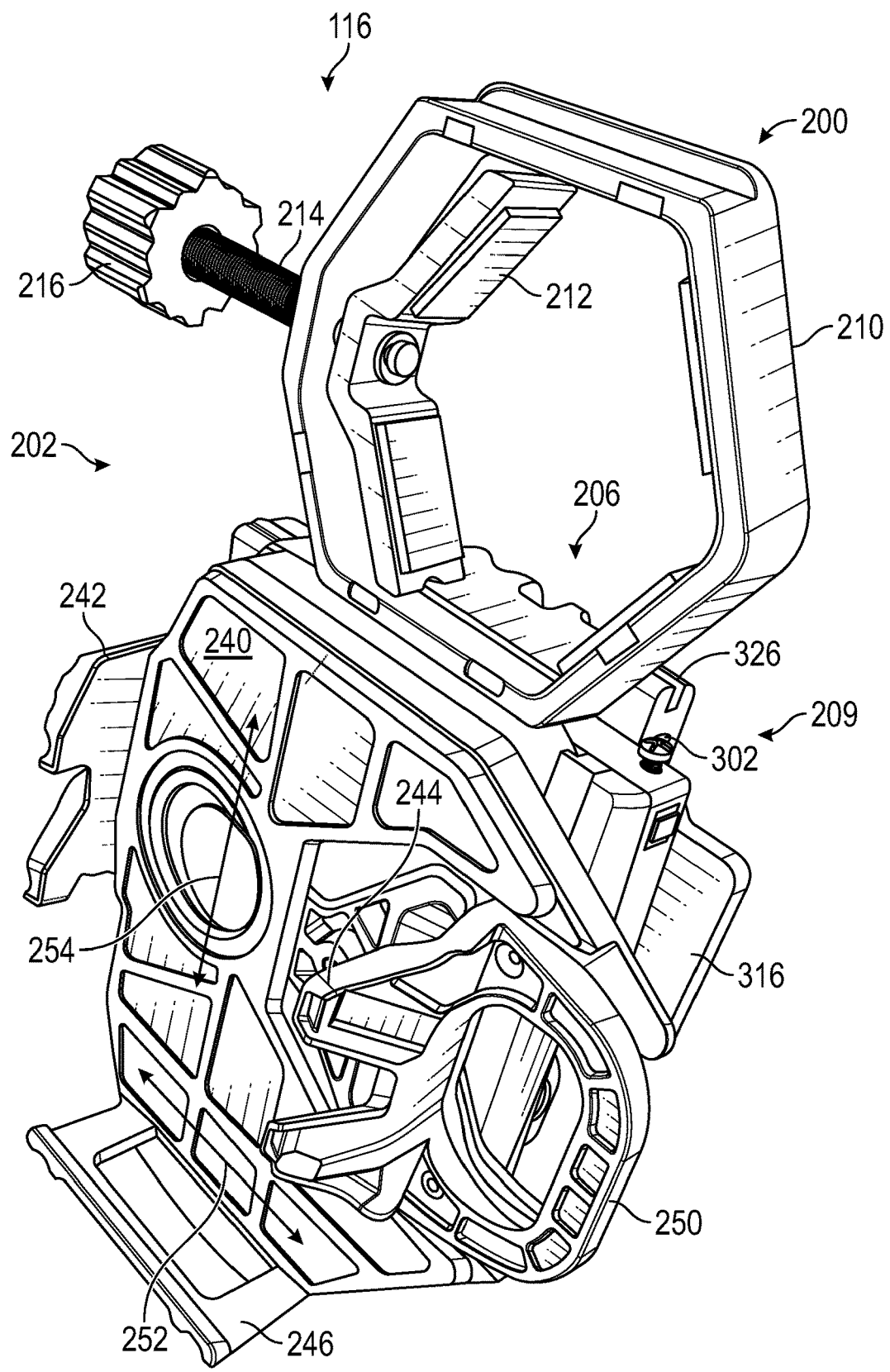
FIGS. 4 and 5 are front and rear perspective views, respectively, of the adapter 116 of FIG. 1, in a deployed (e.g., "unfolded") configuration according to one embodiment.
Figure 5:
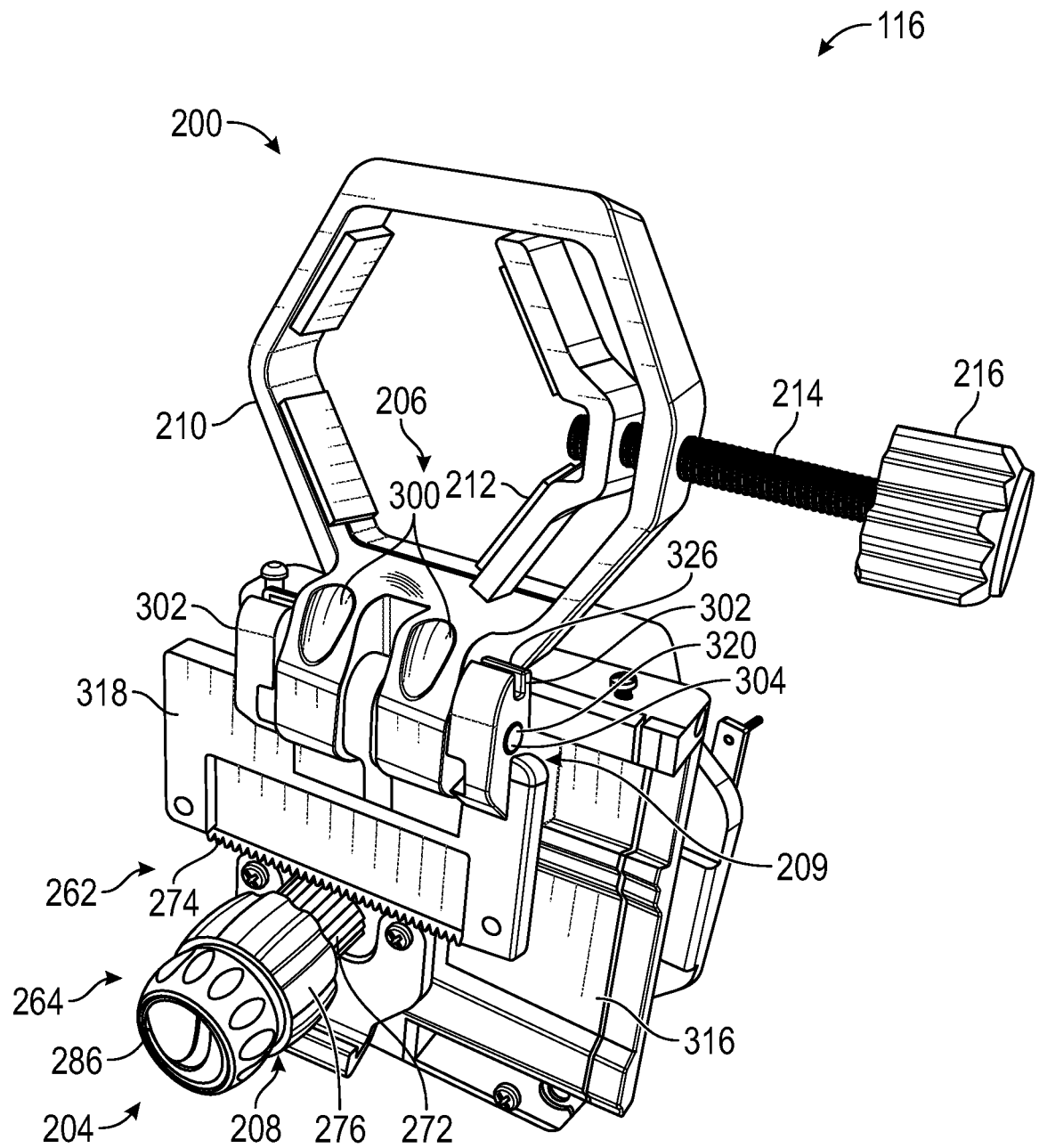

FIGS. 4 and 5 are front and rear perspective views, respectively, of the adapter 116 of FIG. 1, in a deployed (e.g., "unfolded") configuration according to one embodiment.

Figure 6:
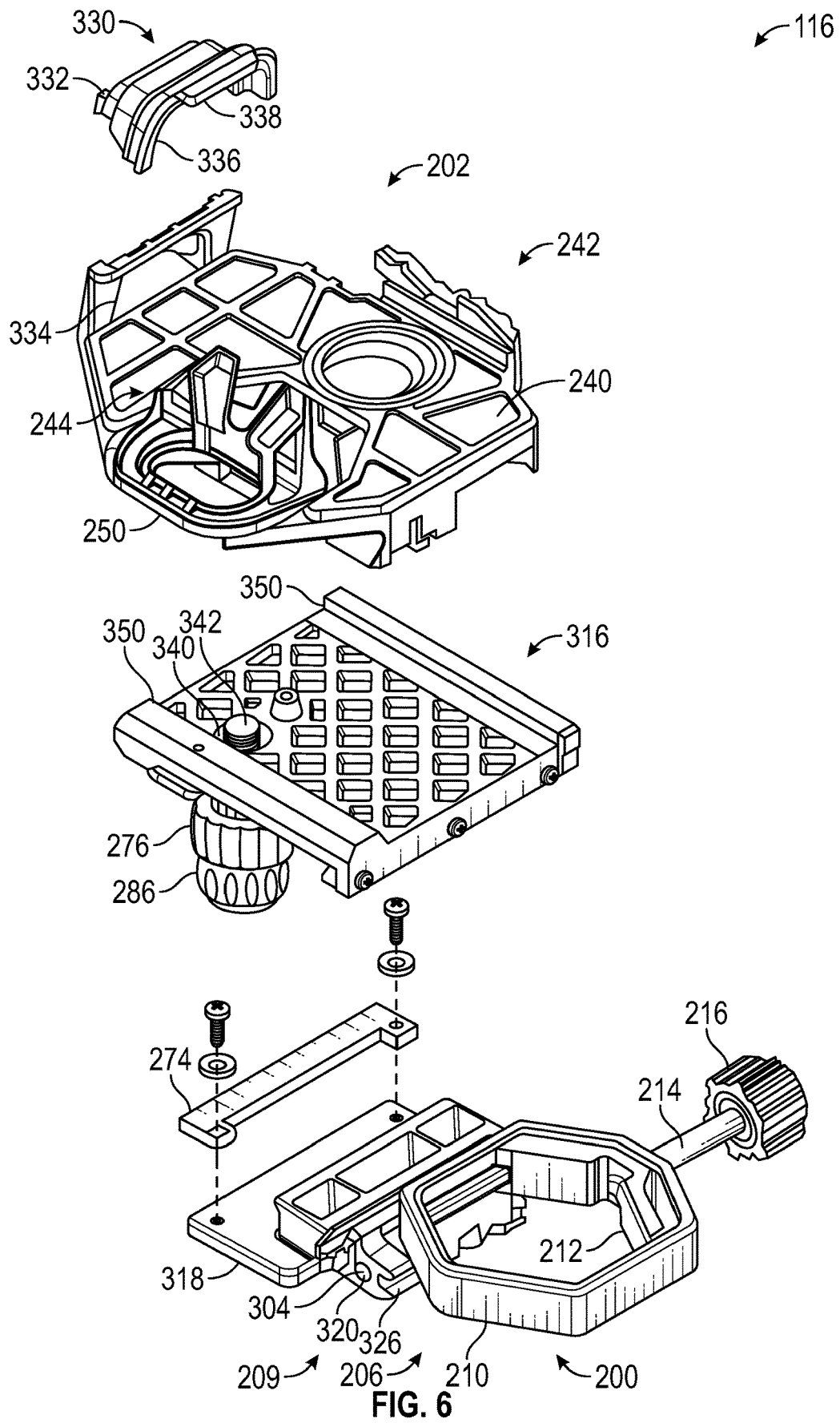
FIG. 6 is an exploded, perspective view of the adapter 116 of FIG. 1.

FIG. 6 is an exploded, perspective view of the adapter 116 of FIG. 1.

Figure 7:
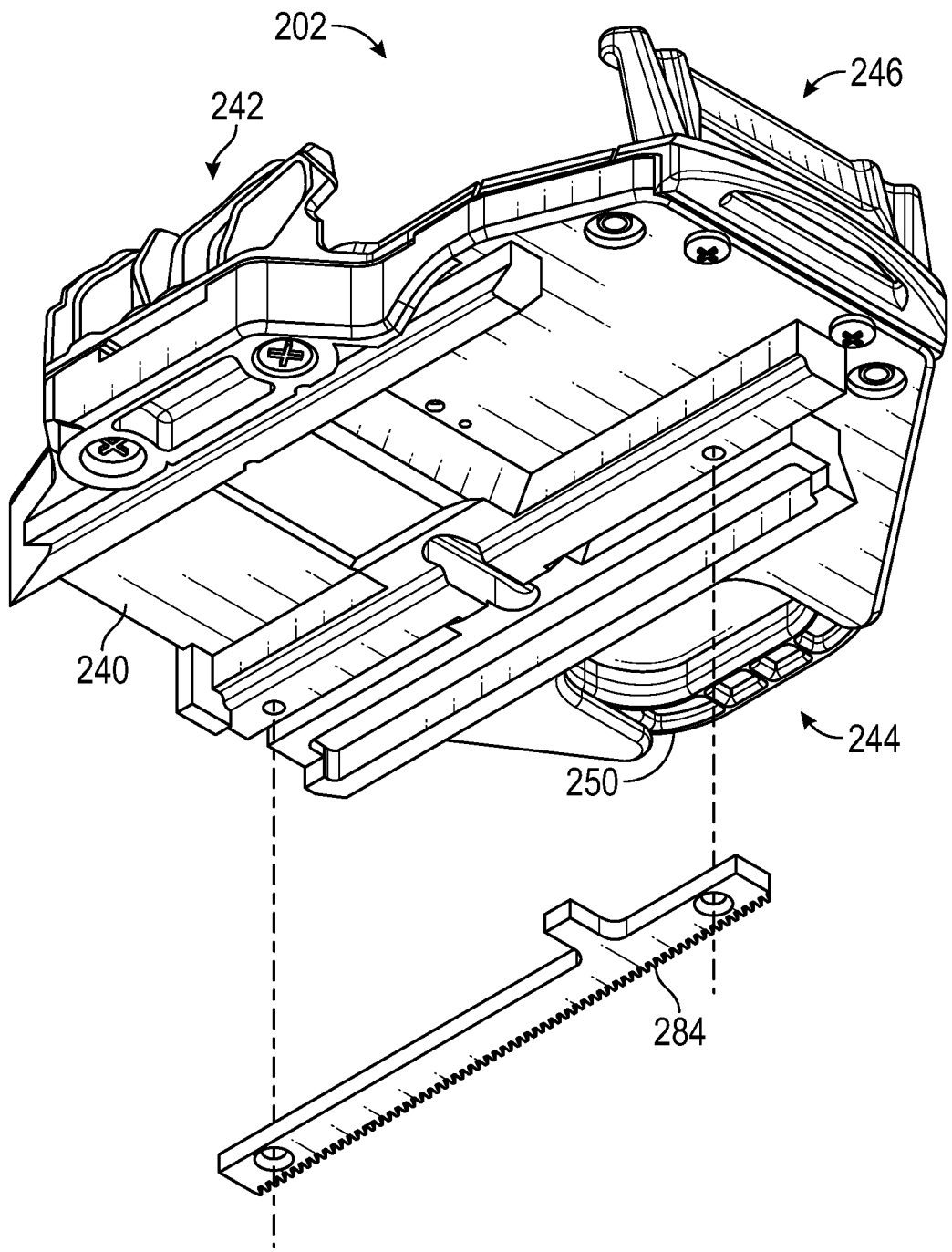
FIGS. 7 and 8 are exploded, perspective views of portions of the adapter 116 of FIG. 1.
Figure 8:
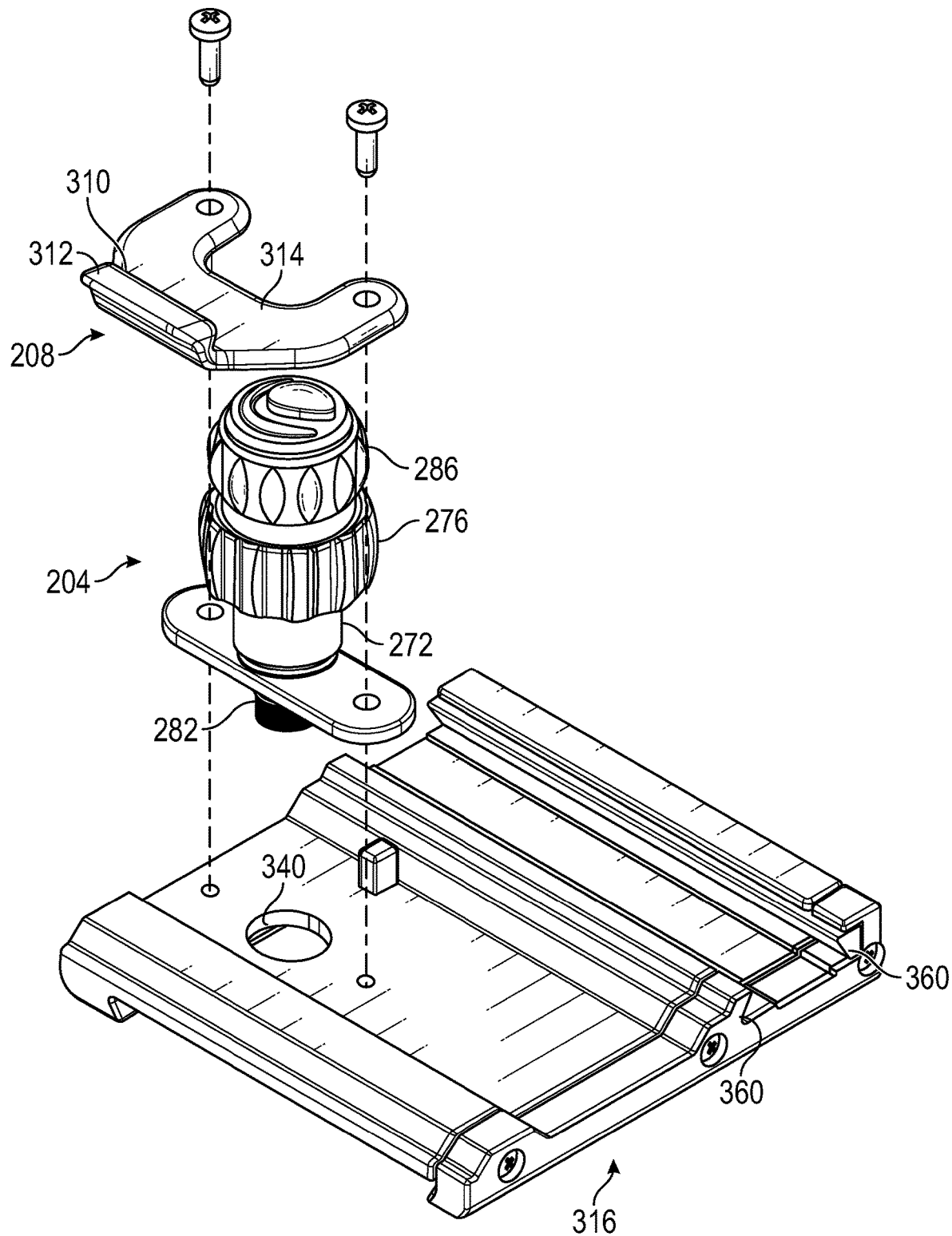

FIGS. 7 and 8 are exploded, perspective views of portions of the adapter 116 of FIG. 1.

Figure 9:
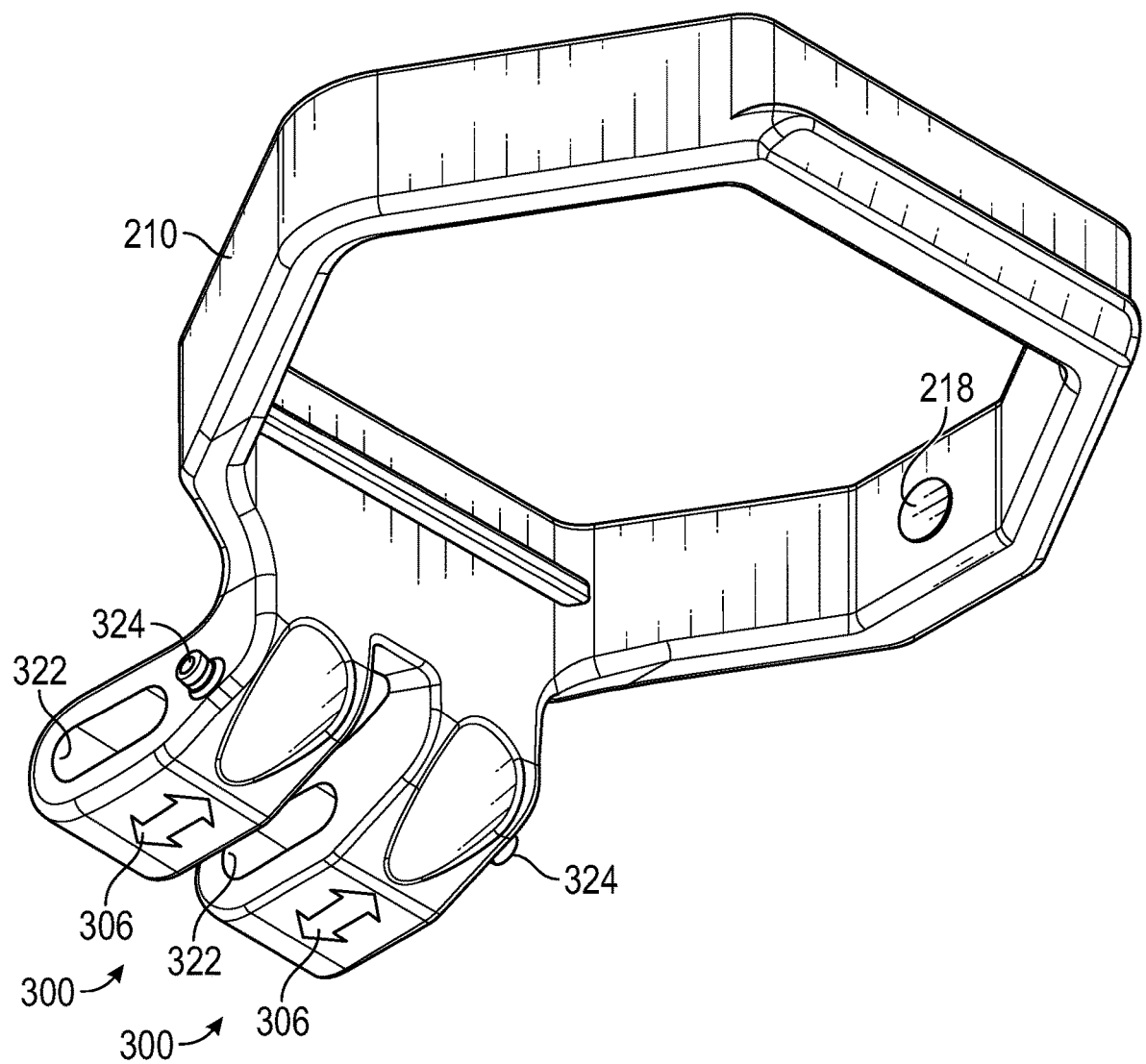
FIG. 9 is a perspective view of part of the optical device mounting feature of FIG. 1.

FIG. 9 is a perspective view of part of the optical device mounting feature of FIG. 1.

Referring to FIGS. 2 through 9, the adapter 116 may have an optical device mounting feature 200 that secures the adapter 116 to the telescope 110, an imaging device mounting feature 202 that secures the smartphone 114 to the adapter 116, and a positioning mechanism 204 that controls the relative position of the imaging device mounting feature 202 relative to the optical device mounting feature 200.

Further, the adapter 116 may have a joint 206 that permits the adapter 116 to move between a stowed configuration, as in FIGS. 2 and 3, and a deployed configuration, as in FIGS. 4 and 5. The stowed configuration may be generally more compact to facilitate storage and transportation of the adapter 116, while the deployed configuration may be suitable for use of the adapter 116 for imaging as shown in FIG. 1.

The adapter 116 may further have a stowed configuration latch 208 that can move between a locked configuration, in which the adapter 116 is locked in the stowed configuration, and an unlocked configuration, in which the adapter 116 is free to move from the stowed configuration to the deployed configuration. Further, the adapter 116 may have deployed configuration latch 209 that can move between a locked configuration, in which the adapter 116 is locked in the deployed configuration, and an unlocked configuration, in which the adapter 116 is free to move from the deployed configuration back to the stowed configuration.

As mentioned previously, the optical device mounting feature 200 may securely attach the smartphone 114 to the telescope 110 in a manner that significantly restricts undesired relative motion between the telescope 110 and the smartphone 114. Thus, the optical device mounting feature 200 may maintain the smartphone 114 at the optical imaging position set by the user with the positioning mechanism 204.

The optical device mounting feature 200 may have a first arm 210 and a second arm 212 connected to the first arm 210 via a threaded shaft 214. The first arm 210 may be stationary, and the second arm 212 may be translatable, relative to the first arm 210, in a direction parallel to the threaded shaft 214. The optical device mounting feature 200 may further have a head 216 that can be rotated to rotate the threaded shaft 214, thereby urging the second arm 212 to translate toward the first arm 210. The threaded shaft 214 may engage a threaded hole 218 in the first arm 210. If desired, the first arm 210 and/or the second arm 212 may have rubber pads or other resilient members on their interior surfaces so that they can frictionally and nondestructively grip the eyepiece 130 of the telescope 110.

As further shown in FIGS. 2 through 9, the imaging device mounting feature 202 may securely receive the smartphone 114. The imaging device mounting feature 202 may have an imaging device support surface 240 with a generally planar shape on which the back of the smartphone 114 can rest. The imaging device support surface 240 may optionally have a resilient coating, such as a rubber coating, that provides secure and scratch-free support for the back of the smartphone 114.

The imaging device mounting feature 202 may further have a first lateral grip 242, a second lateral grip 244, and a bottom flange 246. The bottom flange 246 and the first lateral grip 242 may optionally be fixed in place relative to the imaging device support surface 240, and the second lateral grip 244 may be slidable outward, away from the lateral edges of the imaging device support surface 240, to receive the smartphone 114.

More specifically, the second lateral grip 244 may be coupled to a lateral rail (not shown), which may slide along a slot extending under the imaging device support surface 240, such that the second lateral grip 244 can slide outward relative to the imaging device support surface 240. An internal biasing mechanism such as a spring (not shown) may bias the second lateral grip 244 toward the imaging device support surface 240 (i.e., toward the first lateral grip 242) to cause the first lateral grip 242 and the second lateral grip 244 to grip the smartphone 114 therebetween in the absence of external force drawing the first lateral grip 242 and the second lateral grip 244 apart.

The second lateral grip 244 may optionally have a loop 250 that is easily grasped by the user to facilitate manual motion of the second lateral grip 244 toward or away from the imaging device support surface 240. Thus, the user may grip the loop 250 and pull or push it to move the second lateral grip 244 toward or away from the imaging device support surface 240.

In some examples, the user may mount the smartphone 114 to the imaging device mounting feature 202 by first pulling the loop 250 to draw the first lateral grip 242 and the second lateral grip 244 apart. He or she may then place the smartphone 114 such that the back of the smartphone 114 rests on the imaging device support surface 240. Then, he or she may release the loop 250 to allow the second lateral grip 244 to move toward the first lateral grip 242 to grip the smartphone 114 on the imaging device support surface 240. As will be shown subsequently, the top part of the smartphone 114, including the camera lens, may protrude beyond the imaging device support surface 240 such that the imaging device support surface 240 does not interfere with passage of light from the eyepiece 130 to the camera lens of the smartphone 114.

In alternative embodiments, both the first lateral grip 242 and the second lateral grip 244 may be movable relative to the imaging device support surface 240. For example, the first lateral grip 242 may also be laterally translatable relative to the imaging device support surface 240, and may optionally have a loop like the loop 250 that facilitates gripping and actuation by the user. Optionally, a mechanism, such as a rack-and-pinion system, may be used to cause the first lateral grip 242 and the second lateral grip 244 to move outward equidistantly.

A "positioning mechanism" includes any mechanism that can provide for adjustable positioning of two components with respect to one another, and may thus include any of a wide variety of rotational and/or translating devices, including any mechanical components known in the art for positional adjustment. As mentioned previously, the positioning mechanism 204 may provide adjustable positioning of the imaging device mounting feature 202 relative to the optical device mounting feature 200 (and thence to the telescope 110). This motion may be along one, two, or three orthogonal axes. The adapter 116 of FIGS. 2 through 9 provides an example of two-axis (i.e., X-axis and Y-axis) adjustment.

Specifically, an X-axis 252 may be defined as the axis extending to the left and right (i.e., laterally), when viewing the screen of the smartphone 114 with the smartphone 114 secured to the imaging device mounting feature 202. A Y-axis 254 may be defined as the axis extending up and down, when viewing the screen of the smartphone 114 with the smartphone 114 secured to the imaging device mounting feature 202.

The positioning mechanism 204 may have an X-axis adjustment mechanism 262 that provides adjustment of the position of the imaging device mounting feature 202 relative to the optical device mounting feature 200, along the X-axis 252. The positioning mechanism 204 may also have a Y-axis adjustment mechanism 264 that provides adjustment of the position of the imaging device mounting feature 202 relative to the optical device mounting feature 200, along the Y-axis 254. In alternative embodiments supporting three-axis positioning, a positioning mechanism (not shown) may have a Z-axis adjustment mechanism that provides adjustment of the position of the imaging device mounting feature 202 relative to the optical device mounting feature 200, along a Z-axis (not shown) orthogonal to the X-axis 252 and the Y-axis 254. For example, such a Z-axis adjustment mechanism may be configured as set forth in U.S. Pat. No. 10,795,146, for "Smartphone Adapter for Imaging through Optical Devices," which is incorporated herein by reference.

As embodied in the positioning mechanism 204, each of the X-axis adjustment mechanism 262 and the Y-axis adjustment mechanism 264 may provide for linear translation of the imaging device mounting feature 202 relative to a body 316 of the adapter 116, and to the optical device mounting feature 200. Various mechanically and/or electrically-driven linear actuators may accomplish such a purpose. In the exemplary embodiment of FIGS. 2 through 9, each of the X-axis adjustment mechanism 262 and the Y-axis adjustment mechanism 264 takes the form of a rack-and-pinion system.

More specifically, the X-axis adjustment mechanism 262 may have an X-axis pinion 272, an X-axis rack 274, and an X-axis control knob 276. The Y-axis adjustment mechanism 264 may have a Y-axis pinion 282, a Y-axis rack 284, and a Y-axis control knob 286. For each of the X-axis adjustment mechanism 262 and the Y-axis adjustment mechanism 264, the control knob may be rotated by hand to cause rotation of the associated pinion, thereby inducing the corresponding rack to translate in the corresponding direction (along the X-axis 252 or the Y-axis 254).

The X-axis adjustment mechanism 262 and the Y-axis adjustment mechanism 264 may thus function to not only enable fine control of the position of the imaging device mounting feature 202, relative to the optical device mounting feature 200, along the corresponding direction, but may also serve to securely retain the imaging device mounting feature 202 in place, relative to the optical device mounting feature 200, at the selected relative position. In some embodiments, a separate locking mechanism may be provided for this purpose. However, the rack-and-pinion systems incorporated into the X-axis adjustment mechanism 262 and the Y-axis adjustment mechanism 264 may have sufficient mechanical advantage to retain the imaging device mounting feature 202 in the selected position, relative to the optical device mounting feature 200, until the user further actuates the associated control knob.

Advantageously, the X-axis adjustment mechanism 262 and the Y-axis adjustment mechanism 264 may be actuated independently of each other, and in any order. Thus, the user may position the smartphone 114 in the manner that is most intuitive to the user. The user may find it advantageous to first use the X-axis adjustment mechanism 262 and then the Y-axis adjustment mechanism 264 to align the camera lens of the smartphone 114 with the eyepiece 130, or vice versa.

As further shown in FIG. 6, the body 316 may have a first hole 340 that receives a first shaft 342 that carries the Y-axis rack 284 and the Y-axis control knob 286. The body 316 may also have rails 350 that receive the imaging device mounting feature 202 and permit the imaging device mounting feature 202 to move along the Y-axis 254 relative to the body 316. As further shown in FIG. 8, the opposite side of the body 316 may have a pair of rails 360 that receive a carriage 318 coupled to the optical device mounting feature 200, and permit the carriage 318 to move along the X-axis 252 relative to the body 316.

The joint 206 in the adapter 116 of FIGS. 2 through 9 may enable the optical device mounting feature 200 to rotate between the stowed position, in which the optical device mounting feature 200 is positioned alongside the imaging device support surface 240, and the deployed position, in which the optical device mounting feature 200 extends beyond the profile of the imaging device support surface 240 so that it can be aligned with the camera 162 of the smartphone 114. In alternative embodiments, a joint (not shown) may provide translation or a combination of translation and rotation between the optical device mounting feature 200 and the imaging device mounting feature 202 to enable the adapter to be stowed and deployed.

Positioning the optical device mounting feature 200 alongside the imaging device support surface 240 means positioning the optical device mounting feature 200 such that there is significant overlap between the optical device mounting feature 200 and the imaging device support surface 240, when the adapter 116 is viewed from perpendicular to the imaging device support surface 240. Thus, in the stowed configuration, the optical device mounting feature 200 will be at least partially occluded by, or at least partially in front of, the imaging device support surface 240. Positioning the optical device mounting feature 200 alongside the imaging device support surface 240 does not require that the imaging device support surface 240 entirely occlude the optical device mounting feature 200, or that the entirety of the optical device mounting feature 200 be positioned in front of the imaging device support surface 240.

The joint 206 may have a pin 304 that rotatably couples swing arms 300 secured to the optical device mounting feature 200 with swing arms 302 secured to the carriage 318, which is coupled to the imaging device mounting feature 202. Thus, the joint 206 may be classified as a pin joint.

The stowed configuration latch 208 may have a locking ridge 310, a grip tab 312, and a plate 314 that couples the locking ridge 310 and the grip tab 312 to the body 316 of the adapter 116. The plate 314 may be sufficiently flexible to permit the locking ridge 310 and the grip tab 312 to move between a locked position and an unlocked position. The plate 314 may bias the locking ridge 310 and the grip tab 312 to the locked position.

In the stowed configuration, as shown in FIGS. 2 and 3, the optical device mounting feature 200 may be captured between the locking ridge 310 and the plate 314. A user may move the configuration latch 208 from the locked configuration to the unlocked configuration by pressing on the grip tab 312. This may bend the plate 314 enough to move the locking ridge 310 and the grip tab 312 from the locked position to the unlocked position, thereby releasing the optical device mounting feature 200. The optical device mounting feature 200 may then be able to swing, about the joint 206, away from the body 316.

The deployed configuration latch 209 may be integrated with the swing arms 300 and the swing arms 302 of the joint 206. More specifically, while the swing arms 302 secured to the carriage 318 may capture the pin 304 in holes 320 that permit only rotation of the pin 304, the swing arms 300 secured to the optical device mounting feature 200 may capture the pin 304 in slots 322 that permit the pin 304 to slide along the swing arms 300. This sliding motion may permit limited translation of the optical device mounting feature 200 relative to the imaging device mounting feature 202. Arrows 306 on the swing arms 300 may indicate to the user the direction in which this translation can be carried out.

The deployed configuration latch 209 may further have protrusions 324 that extend laterally outward from the swing arms 300 secured to the optical device mounting feature 200, and recesses 326 formed in the swing arms 302 secured to the carriage 318. The recesses 326 may only align with the protrusions 324 when the adapter 116 is in the deployed configuration. In the deployed configuration, the optical device mounting feature 200 may slide toward the imaging device mounting feature 202 by sliding the pin 304 in the slots 322 such that the protrusions 324 on the swing arms 300 translate into the recesses 326 on the swing arms 302. This may move the deployed configuration latch 209 from the unlocked configuration to the locked configuration.

More specifically, when the protrusions 324 are in the recesses 326, the optical device mounting feature 200 may be unable to rotate relative to the imaging device mounting feature 202. Thus, the adapter 116 may be locked in the deployed configuration until the deployed configuration latch 209 is moved back to the unlocked configuration by translating the optical device mounting feature 200 away from the imaging device mounting feature 202 so that the protrusions 324 are removed from the recesses 326. Actuating the deployed configuration latch 209 to the locked position during imaging may help prevent the imaging device mounting feature 202 (and the camera 162 of the smartphone 114) from inadvertently being moved relative to the optical device mounting feature 200 (and the telescope 110) due to accidental actuation of the joint 206.

Optionally, the recesses 326 may have narrowed openings or other detent features that cause the protrusions 324 to snap into position as they are translated into the recesses 326. The detent features may retain the deployed configuration latch 209 in the locked configuration until the retaining force of the detent features is overcome, for example, by the user pulling the optical device mounting feature 200 away from the imaging device mounting feature 202 with sufficient force to snap the protrusions 324 out of the recesses 326.

The adapter 116 may be dimensioned to accommodate smartphones that are at least five inches long. For shorter imaging devices, such as smartphones less than five inches long, a booster 330 (shown in FIG. 6) may optionally be used in conjunction with the imaging device mounting feature 202. The booster 330 may be designed to reside on the bottom flange 246 to act as a spacer that seats the smartphone 114 at a predetermined displacement from the bottom flange 246.

The booster 330 may have a flange interface 332 that connects to the bottom flange 246, for example via insertion into and/or snapping into engagement with an aperture 334 in the bottom flange 246. Further, the booster 330 may have an imaging device support surface 336 on which the smartphone 114 can rest, and a tab 338 that extends beyond the imaging device support surface 336 to retain the smartphone 114 on the imaging device support surface 336.

Exemplary Deployment Method

Figure 10:
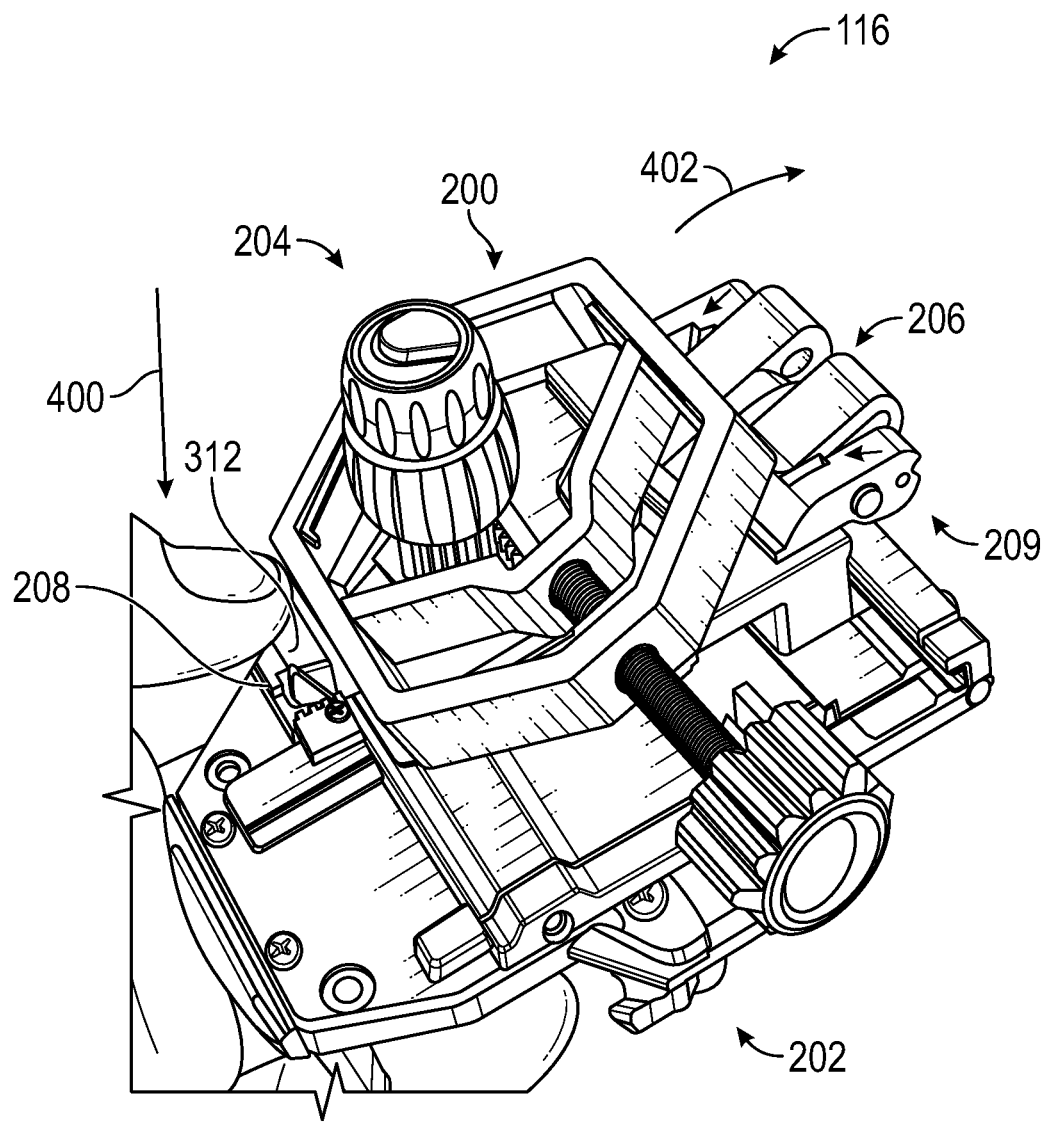
FIGS. 10, 11, and 12 are perspective views showing motion of the adapter of FIG. 1 from a stowed configuration to a deployed configuration.
Figure 11:
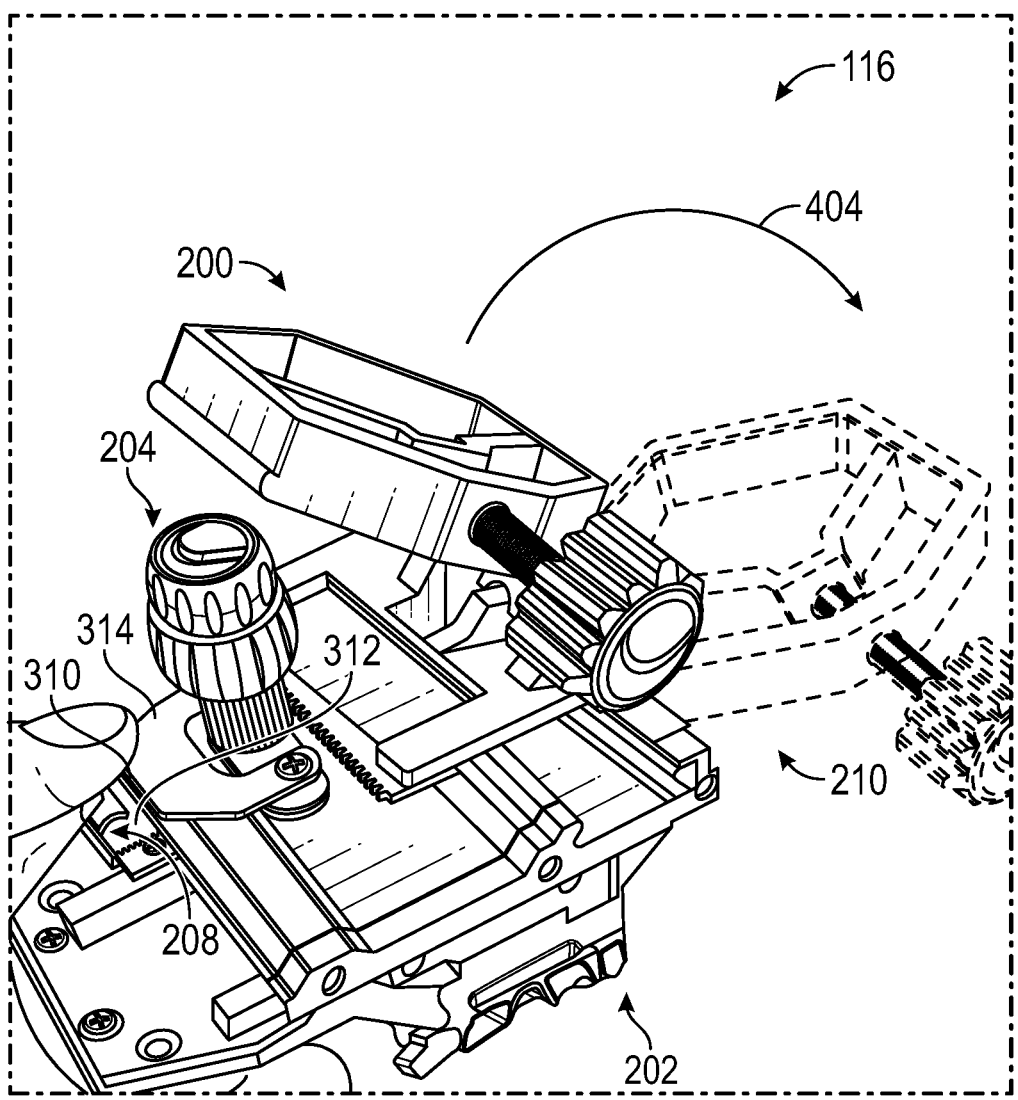
Figure 12:
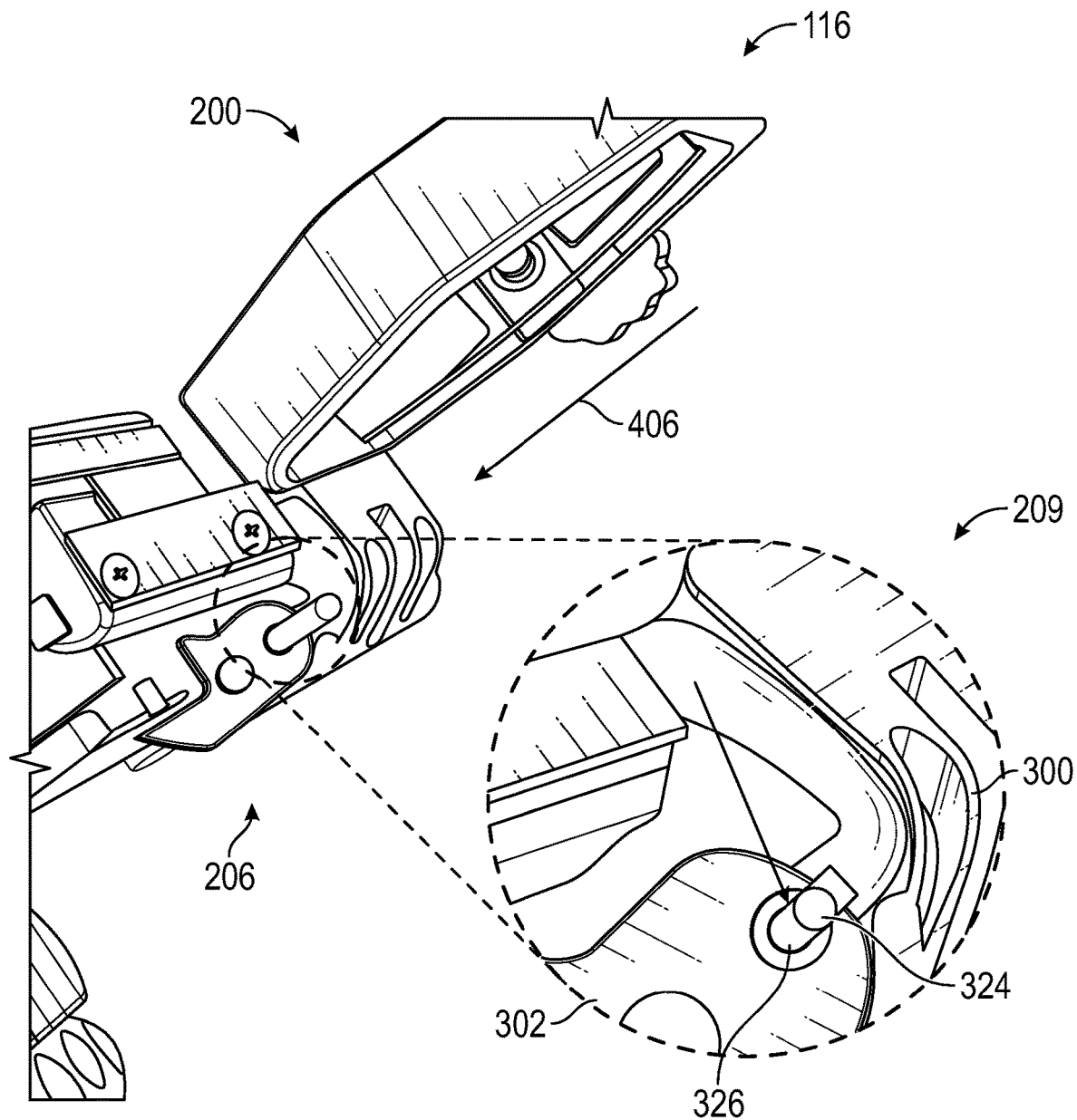

FIGS. 10 through 12 depict steps for moving the adapter 116 from the stowed configuration to the deployed configuration, according to one embodiment.

As shown in FIG. 10, and with reference to FIG. 8, the user may first move the stowed configuration latch 208 from the locked configuration to the unlocked configuration. This may be done by depressing the grip tab 312 in the direction shown by the arrow 400, for example, with the thumb, thus bending the plate 314 and drawing the locking ridge 310 away from the optical device mounting feature 200, from the locked position to the unlocked position. This may enable the optical device mounting feature 200 to swing, via the joint 206, along the direction shown by arrow 402.

As shown in FIG. 11, the user may then swing the optical device mounting feature 200 along the direction shown by the arrow 404. Once the optical device mounting feature 200 has moved through a 180° arc, relative to the imaging device mounting feature 202, the adapter 116 is in the deployed configuration.

As shown in FIG. 12, the adapter 116 is then in the deployed configuration. The deployed configuration latch 209 may be actuated from the unlocked configuration to the locked configuration to retain the adapter 116 in the deployed configuration until the user is ready to stow it again. With the adapter 116 in the deployed configuration, the protrusions 324 may be aligned with the recesses 326 of the swing arms 302 secured to the carriage 318. The user may press the optical device mounting feature 200 against the carriage 318 and the imaging device mounting feature 202 along the direction of the arrow 406 to cause the protrusions 324 to enter the recesses 326, as shown in the inset. The pin 304 may slide along the slots 322 to accommodate this compression of the joint 206.

As mentioned previously, the recesses 326 may have narrower openings such that the protrusions 324 snap into the recesses 326. Thus, the user may hear and/or feel the protrusions 324 snap into place, providing auditory and/or tactile confirmation that the deployed configuration latch 209 is in the locked configuration. In the locked configuration, the protrusions 324 and the recesses 326 may cooperate to prevent further motion of the joint 206, thereby keeping the optical device mounting feature 200 from swinging back (opposite the arrow 404 of FIG. 11) to the stowed configuration. This may help the optical device mounting feature 200 to remain at a fixed position relative to the imaging device mounting feature 202 such that the alignment of the camera 162 of the smartphone 114 with the eyepiece 130 is not inadvertently disturbed by unintended motion of the joint 206.

Exemplary Optical Device Coupling Method

Figure 13:
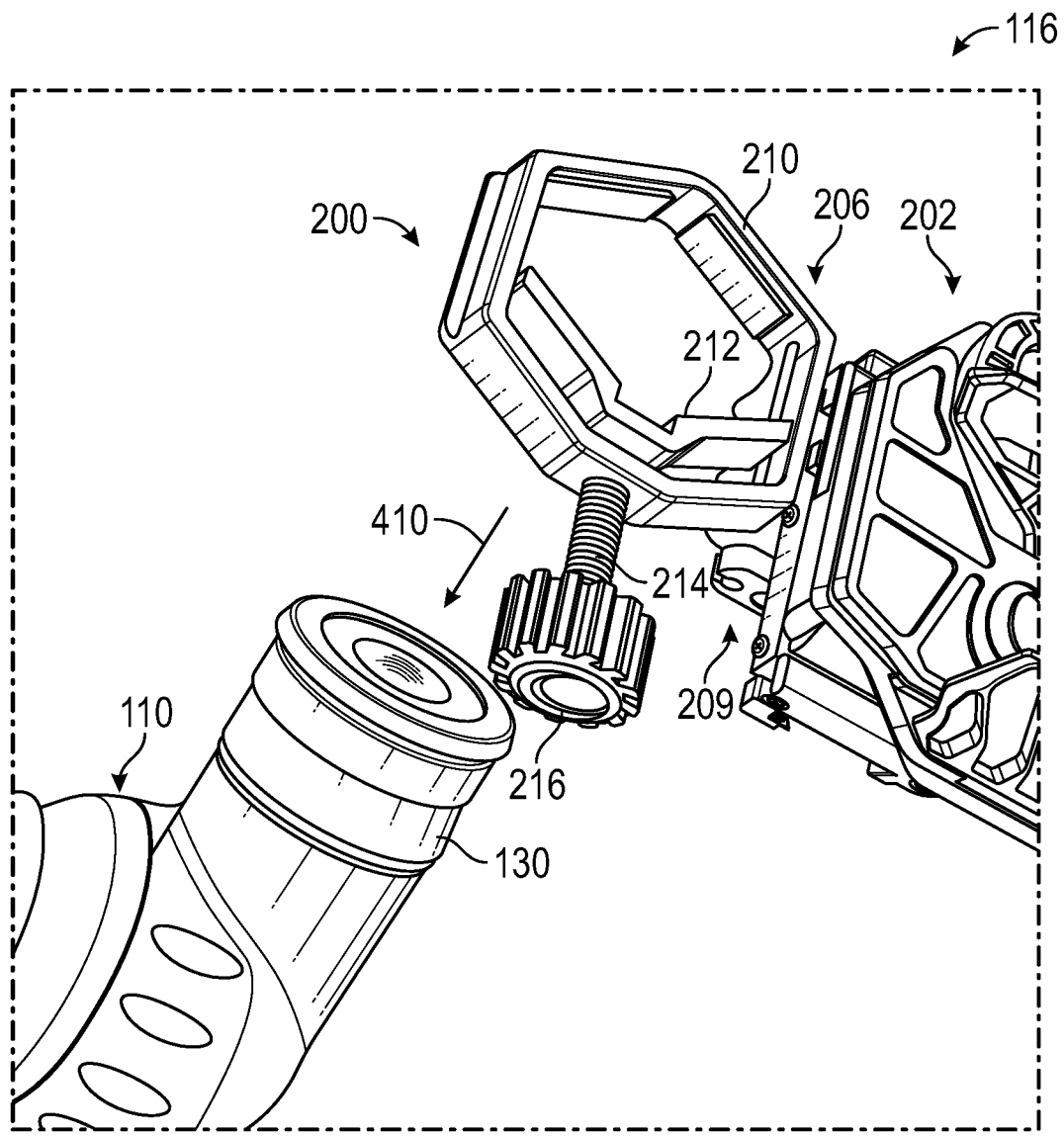
FIGS. 13 and 14 are perspective views showing mounting of the adapter of FIG. 1 on an eyepiece of a telescope.
Figure 14:
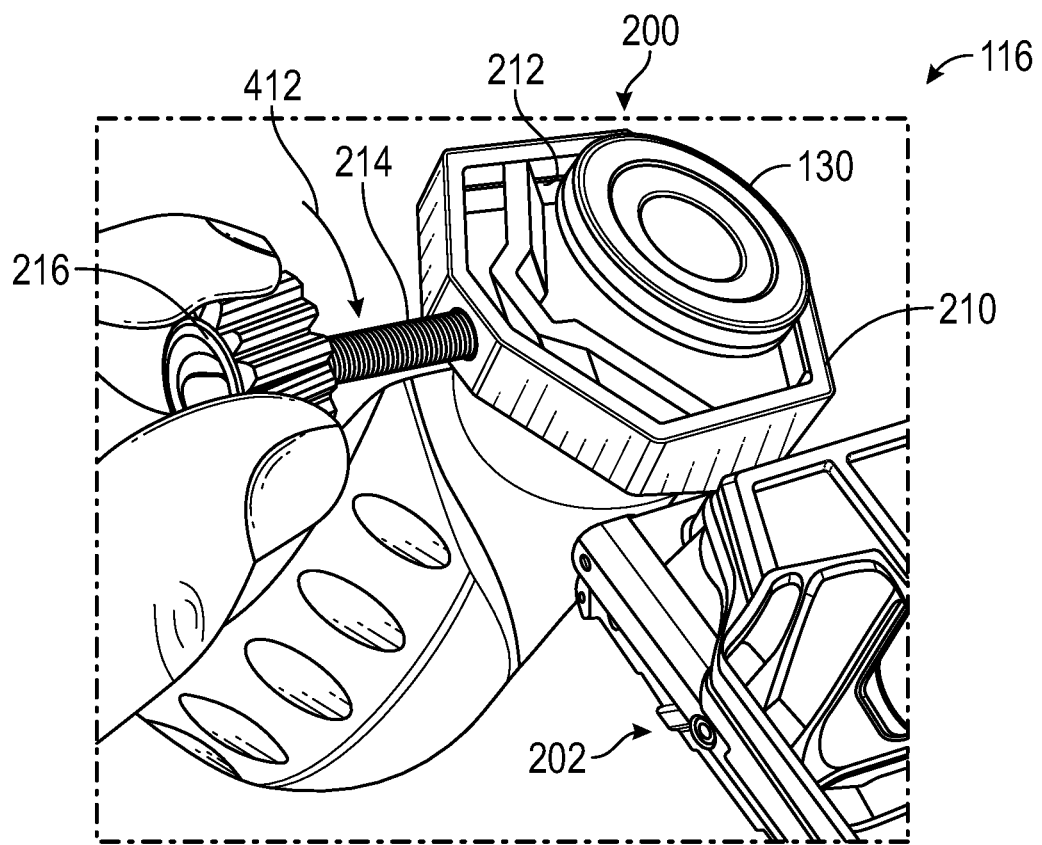

FIGS. 13 and 14 depict steps for coupling the adapter 116 to the telescope 110, according to one embodiment.

The user may secure the optical device mounting feature 200 of the adapter 116 to the eyepiece 130 as indicated above. The method may be similar for telescopes, binoculars, and spotting scopes, and other types of optical devices. The user may rotate the head 216 counterclockwise between thumb and forefinger to rotate the threaded shaft 214 in the same direction, causing the second arm 212 to retract from the first arm 210. Once the second arm 212 and the first arm 210 are sufficiently spaced apart to receive the eyepiece 130, the user may insert the eyepiece 130 into the space between the first arm 210 and the second arm 212, for example, by moving the optical device mounting feature 200 along the direction shown by arrow 410 of FIG. 13, relative to the eyepiece 130. For microscopes, prior to performing these steps, the user may attach an adapter ring (not shown) that fits the microscope's eyepiece to increase its effective diameter so that the optical device mounting feature 200 can effectively grip it. The user may then rotate the head 216 clockwise, as shown by arrow 412 of FIG. 14, to rotate the threaded shaft 214 in the same direction, causing the second arm 212 to move toward the first arm 210 until the eyepiece 130 is clamped between the first arm 210 and the second arm 212.

Exemplary Imaging Device Coupling Method

Figure 15:
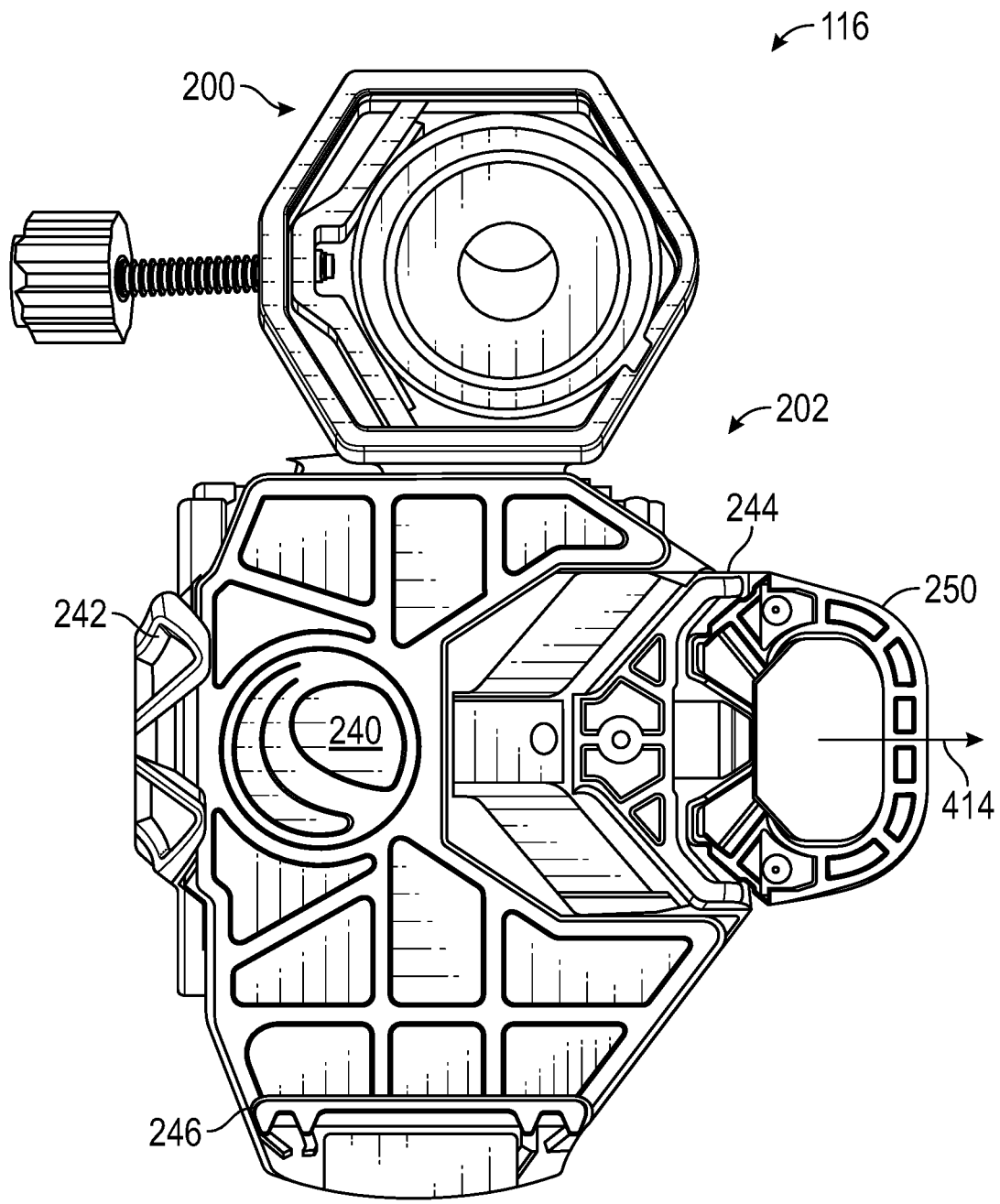
FIGS. 15, 16, and 17 are front elevation views showing mounting of a smartphone on the adapter of FIG. 1.
Figure 16:
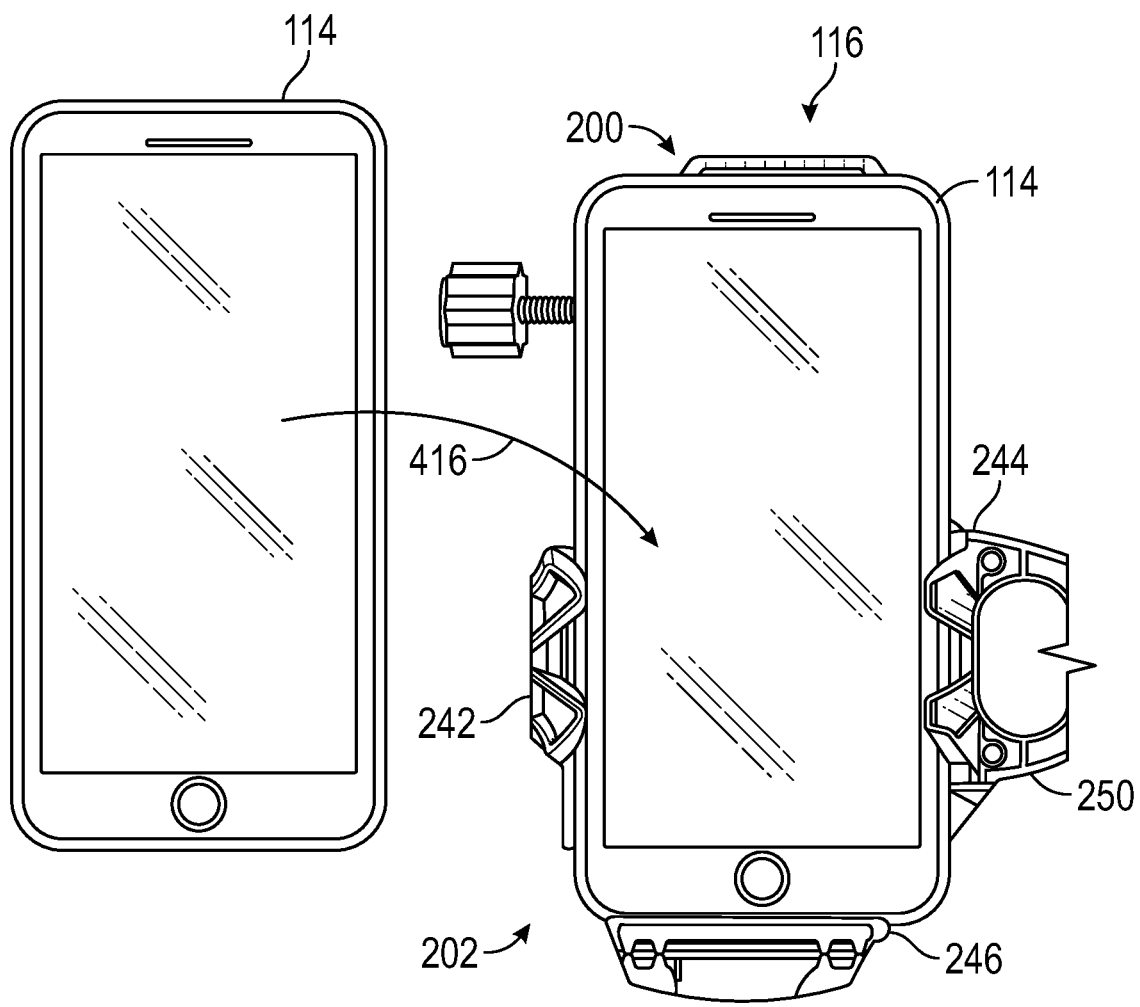
Figure 17:
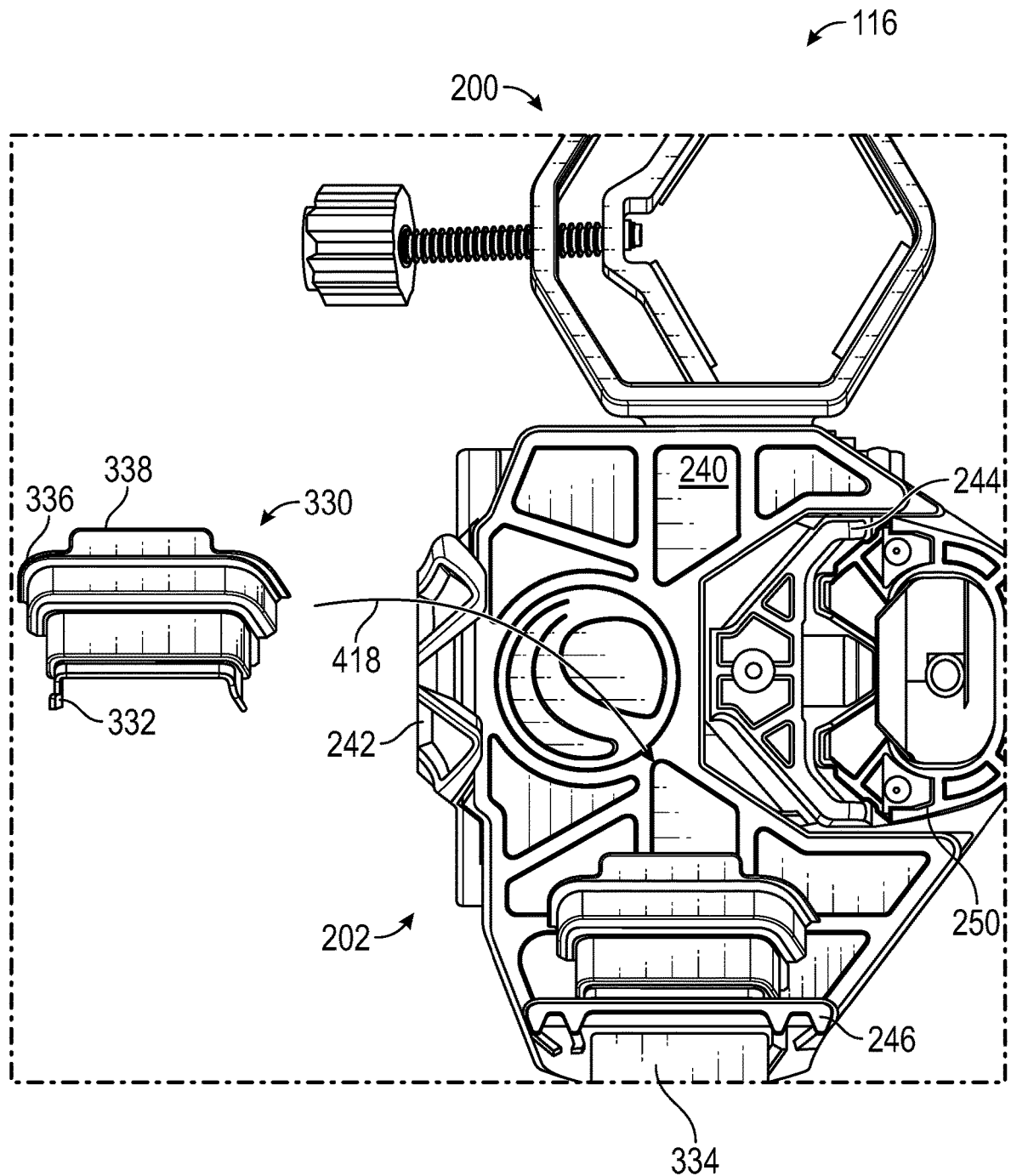

FIGS. 15, 16, and 17 depict steps for coupling the smartphone 114 to the adapter 116, according to one embodiment.

The user may secure the smartphone 114 to the imaging device mounting feature 202 of the adapter 116 as indicated above. The user may extend the second lateral grip 244 by grasping and pulling the loop 250 in the direction shown by arrow 414 of FIG. 15, as described above. The user may then place the smartphone 114 on the imaging device support surface 240, as indicated by arrow 416 of FIG. 16, making sure the bottom of the smartphone 114 rests on the bottom flange 246 and the back of the smartphone 114 rests on the imaging device support surface 240, and release the loop 250 to allow the second lateral grip 244 to move toward the imaging device support surface 240 such that the first lateral grip 242 and the second lateral grip 244 grip the sides of the smartphone 114. The smartphone 114 is now secure.

In the event that the smartphone 114 is smaller than a threshold size (for example, five inches in length), the booster 330 may first be placed on the bottom flange 246, as shown by arrow 418 of FIG. 17, before the smartphone 114 is placed on the imaging device support surface 240. As shown in FIG. 17, the booster 330 may be positioned such that the flange interface 332 of the booster 330 is seated in the aperture 334 of the bottom flange 246. Then, the smartphone 114 may be placed on the imaging device support surface 240 and gripped between the first lateral grip 242 and the second lateral grip 244 as set forth above, except that the bottom of the smartphone 114 may rest on the imaging device support surface 336 of the booster 330, rather than resting directly on the bottom flange 246. The tab 338 of the booster 330 may help retain the bottom of the smartphone 114 in place on the bottom flange 246.

Exemplary Adjustment Method

Figure 18:
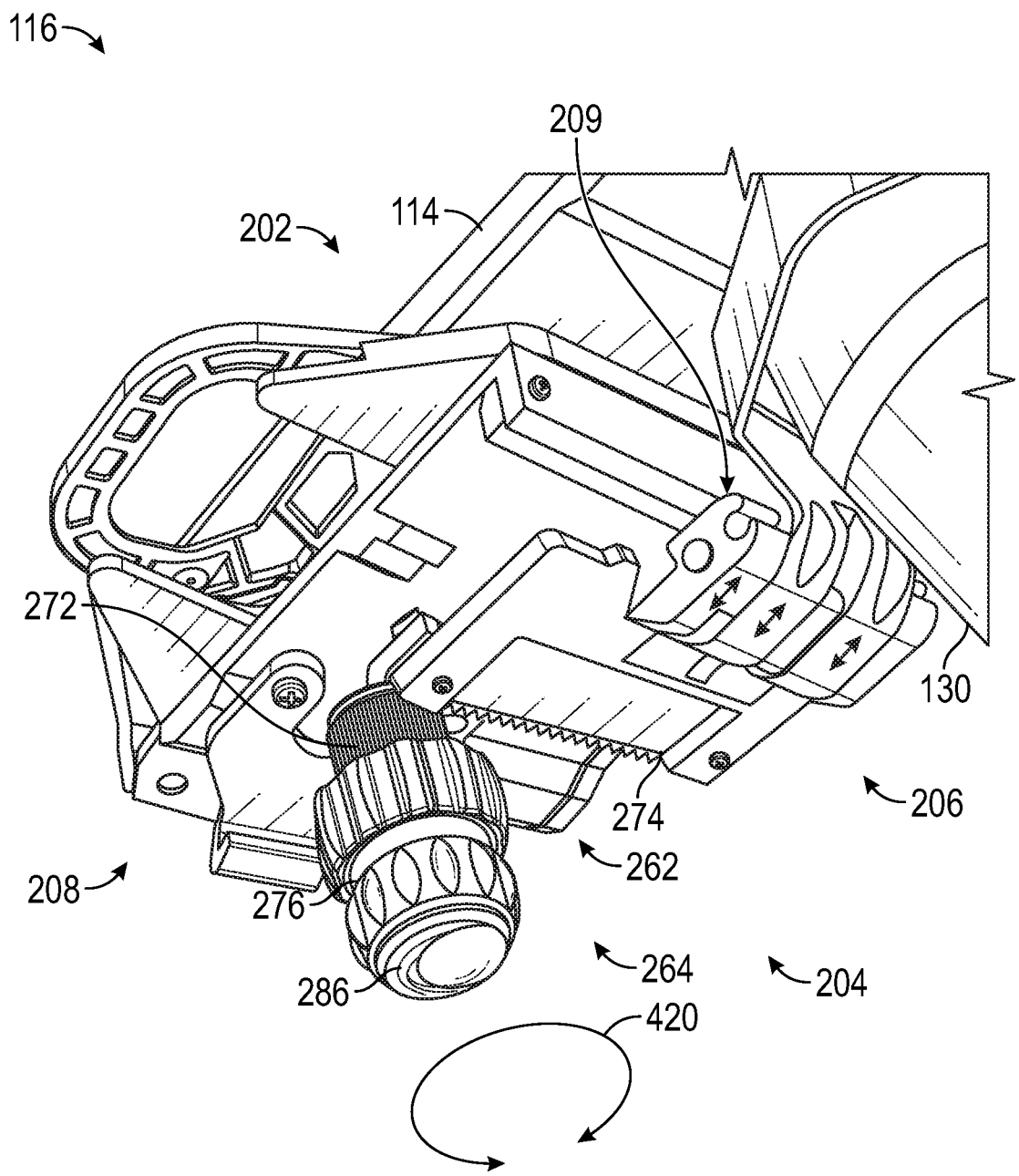
FIGS. 18, 19, and 20 are perspective (FIGS. 18 and 20) and front elevation (FIG. 19) views showing adjustment of the position of the smartphone relative to the eyepiece, using the adapter of FIG. 1.
Figure 19:
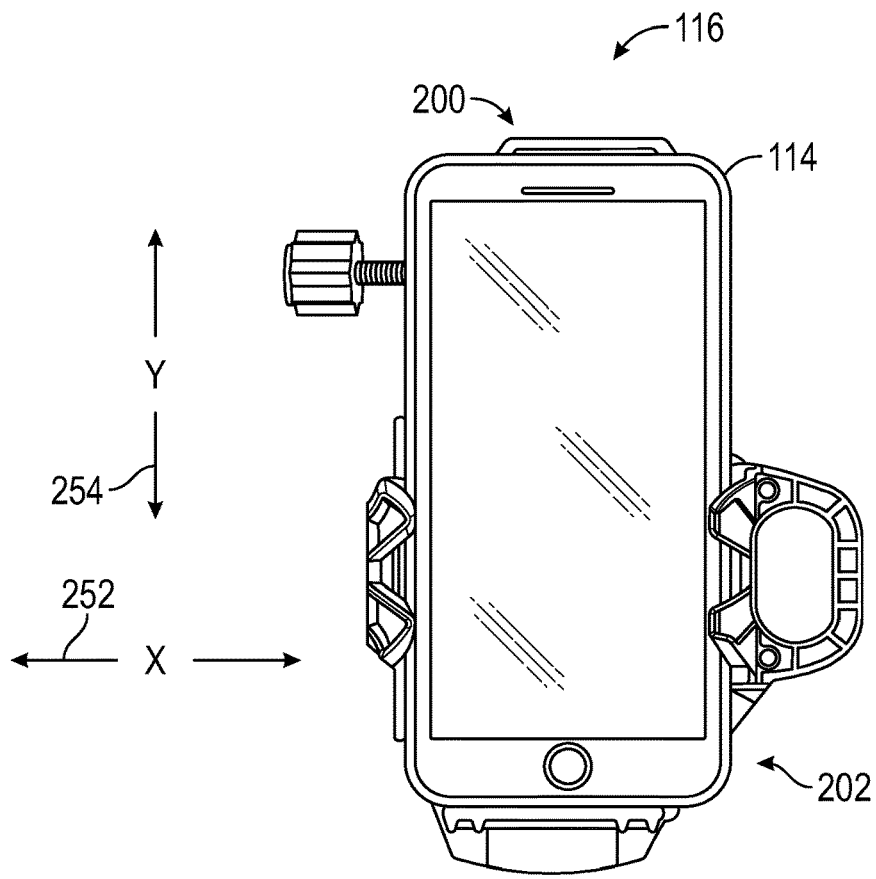
Figure 20:
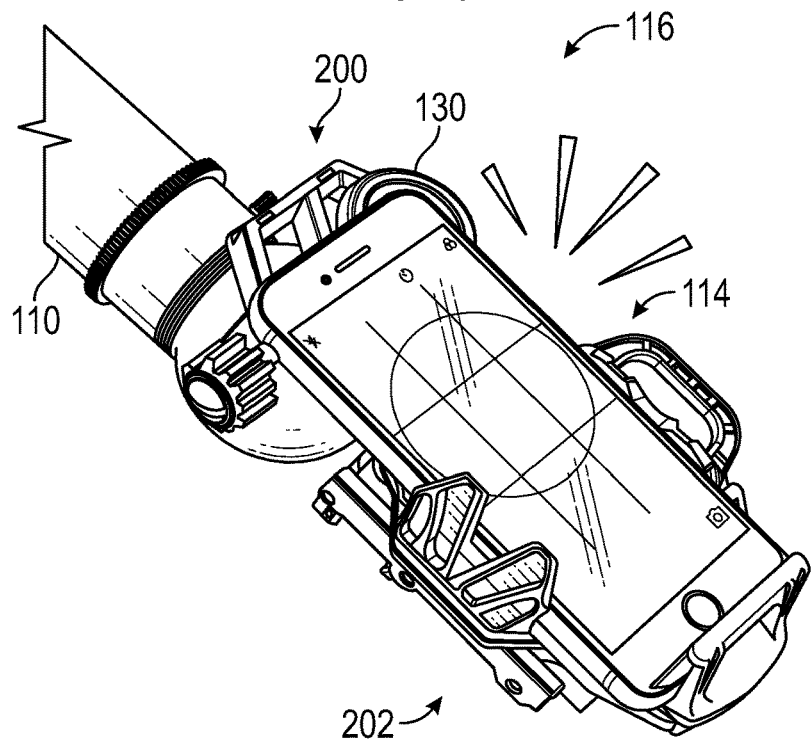

FIGS. 18, 19, and 20 depict steps for adjusting the position of the smartphone 114 relative to the eyepiece 130. This may be done using the positioning mechanism 204 as described above.

The user may open a camera app on the smartphone 114 and position the camera 162 of the smartphone 114 over the eyepiece 130 using the X-axis control knob 276 and the Y-axis control knob 286. More specifically, the user may adjust the X-axis control knob 276 and the Y-axis control knob 286 until the image provided by the telescope 110 is centered on the output device 172 of the smartphone 114, as shown in FIG. 20. The X-axis control knob 276 and/or the Y-axis control knob 286 may be rotated clockwise and/or counterclockwise as needed, as indicated by arrow 420 of FIG. 18. The user may then adjust the focus with the telescope 110 and/or the smartphone 114 and proceed to capture images.

Once imaging is complete, the smartphone 114 may be detached from the telescope 110 and the smartphone 114. This may be done by employing the reverse of the steps set forth above in FIGS. 13 through 17. Thus, the smartphone 114 may be decoupled (i.e., dismounted) from the optical device mounting feature 200 and the imaging device mounting feature 202.

Exemplary Stowing Method

FIGS. 21 through 24 depict steps for moving the adapter 116 from the deployed configuration back to the stowed configuration, according to one embodiment. These steps may be carried out after the adapter 116 has been decoupled from the smartphone 114 and the telescope 110.

Figure 21:
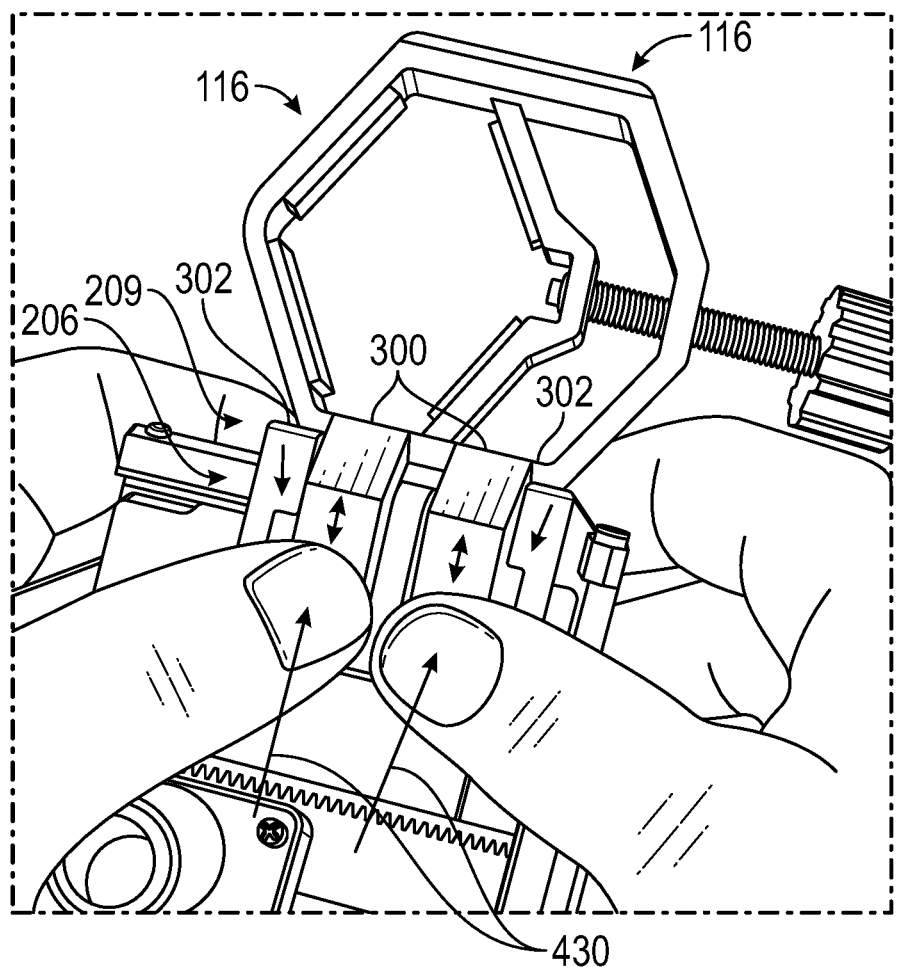
FIGS. 21, 22, 23, and 24 are perspective (FIGS. 21, 23, and 24) and front elevation (FIG. 22) views showing motion of the adapter of FIG. 1 from a deployed configuration to a stowed configuration.
Figure 22:
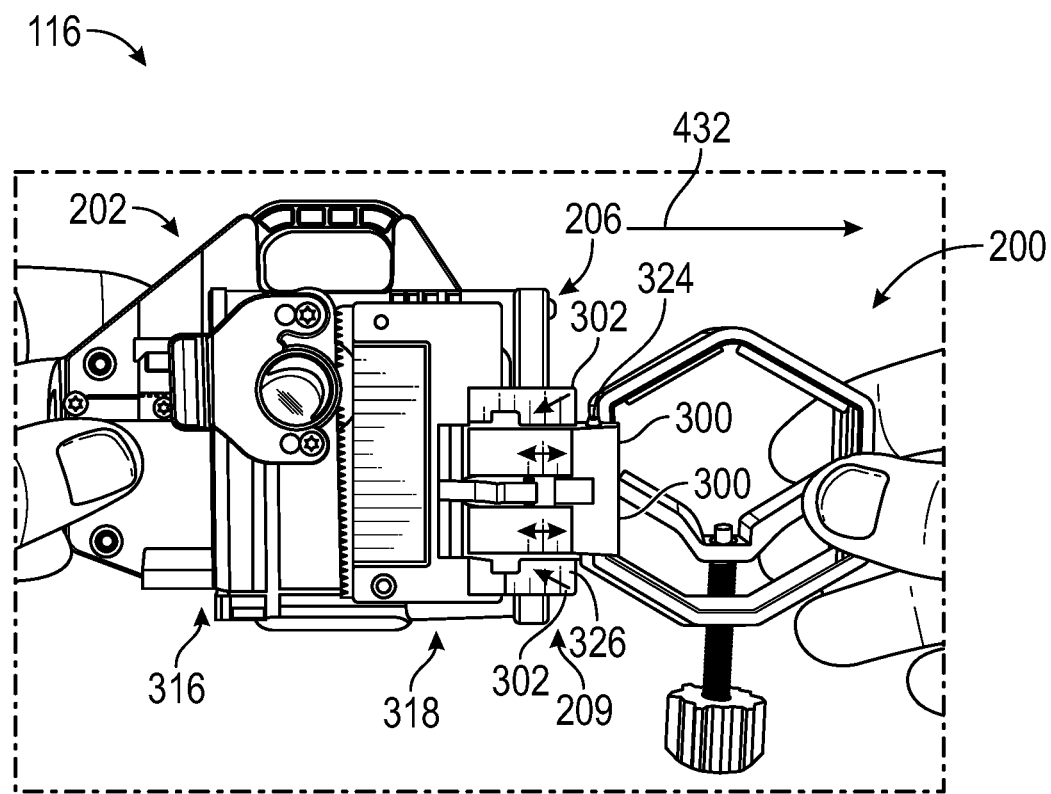
Figure 23:
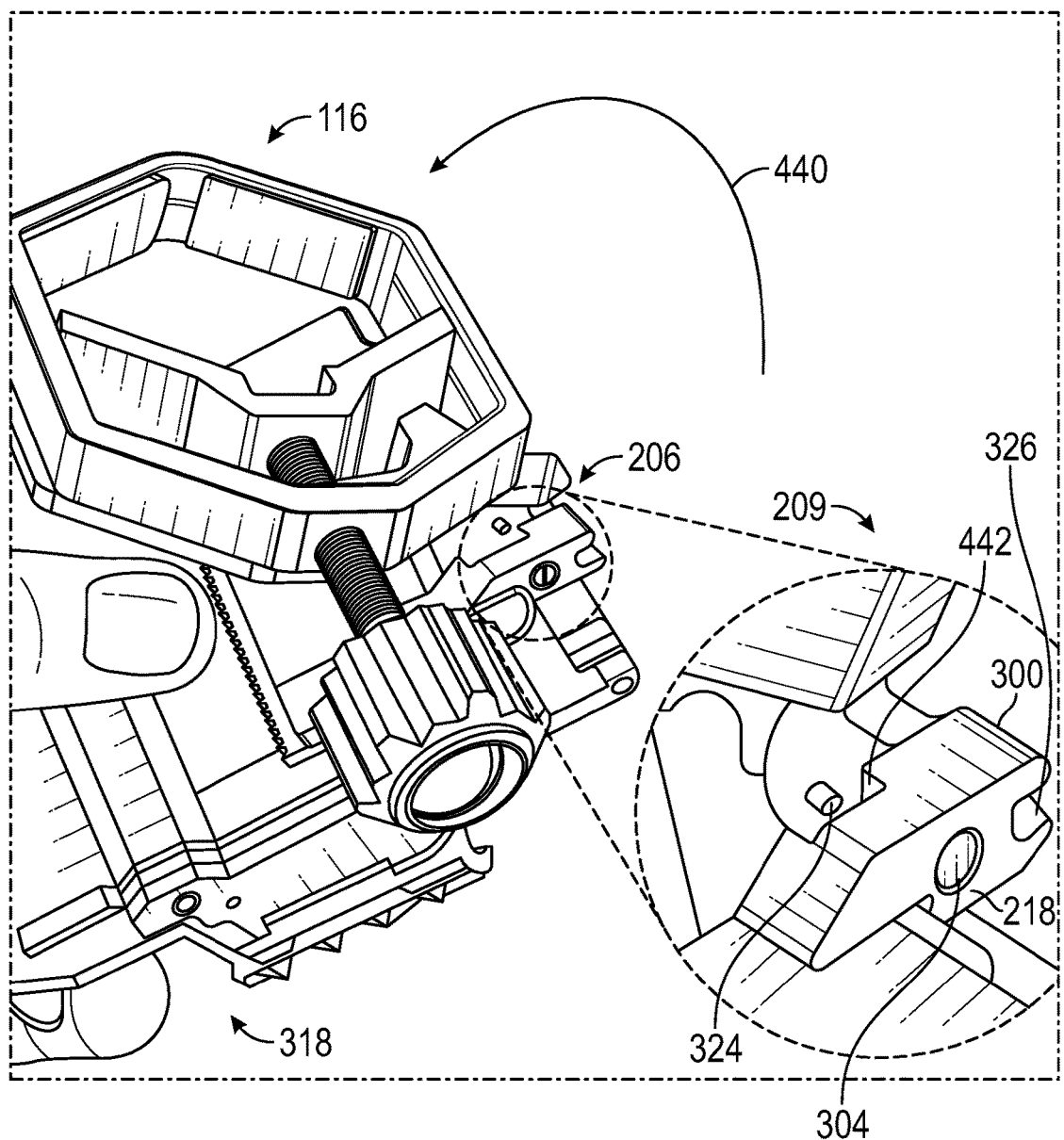

More specifically, the deployed configuration latch 209 may be moved to the unlocked position by pulling and/or pushing the optical device mounting feature 200 away from the imaging device mounting feature 202, as shown by the arrows 430 of FIG. 21 and the arrow 432 of FIG. 22. This may cause the protrusions 324 to snap out of the recesses 326 of the swing arms 300. Once the protrusions 324 have exited the recesses 326, the optical device mounting feature 200 may be rotated about the pin 304 by moving the optical device mounting feature 200 along the arrow 440 of FIG. 23.

As the joint 206 approaches the stowed configuration, the protrusions 324 may slide into stowage recesses 442 formed in the swing arms 300 secured to the optical device mounting feature 200. This engagement of the protrusions 324 with the stowage recesses 442 may allow the optical device mounting feature 200 to seat more closely against remainder of the adapter 116 (i.e., the carriage 318, the body 316, and the imaging device mounting feature 202).

Figure 24:
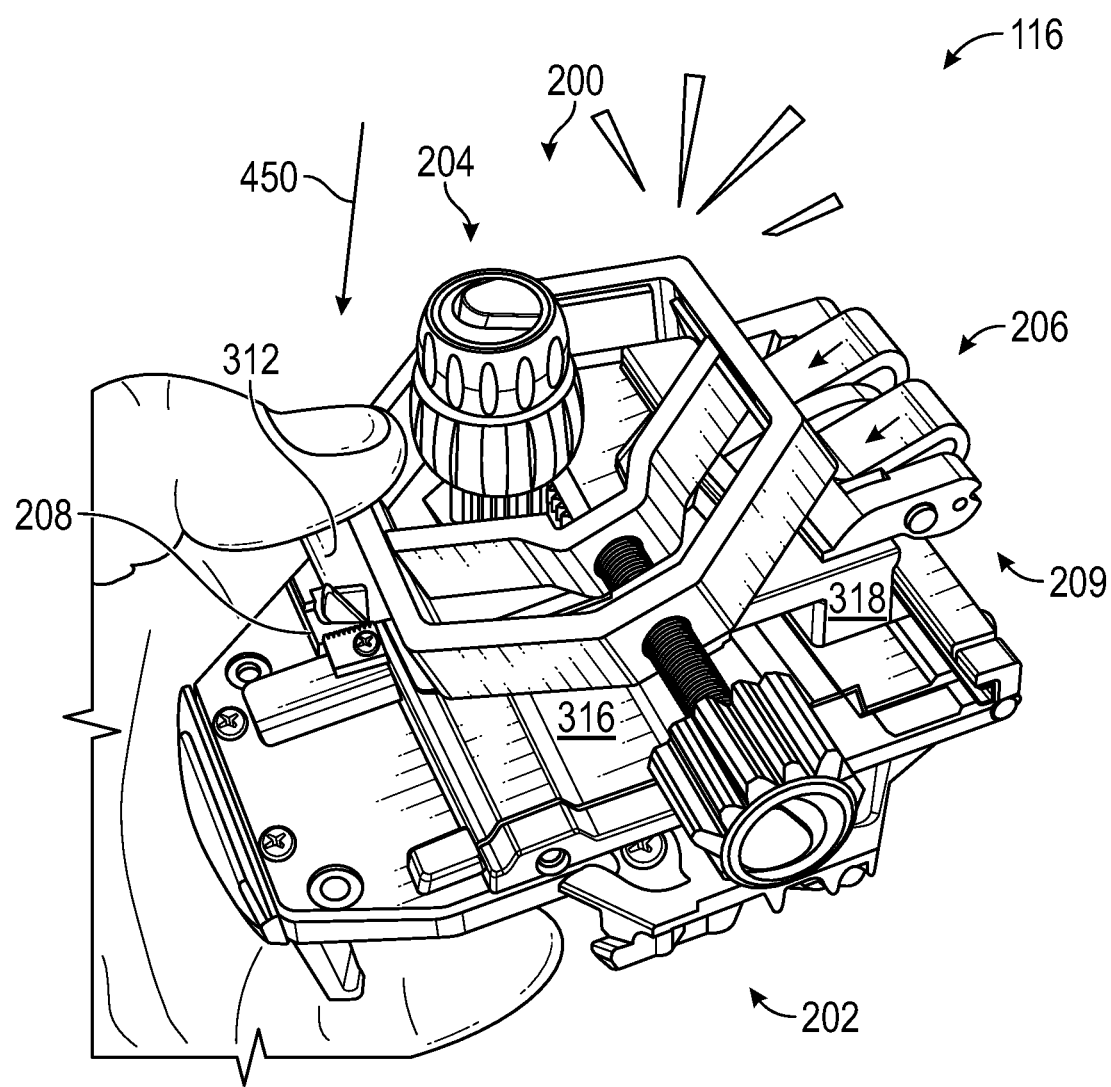

The optical device mounting feature 200 may engage the stowed configuration latch 208 as it moves, in the direction of arrow 450 of FIG. 24, to the stowed configuration. Specifically, the first arm 210 may engage the locking ridge 310 and urge the locking ridge 310 and the grip tab 312 to move away from the optical device mounting feature 200 until the optical device mounting feature 200 has fully come to the stowed configuration. Then, the locking ridge 310 may snap back into place such that the locking ridge 310 holds the optical device mounting feature 200 against the remainder of the adapter 116. If desired, the user may optionally push on the grip tab 312 to manually move the locking ridge 310 out of the path of the optical device mounting feature 200, and then release it when the optical device mounting feature 200 has reached the stowed configuration. In either case, the locking ridge 310 may, under the resilient force of the plate 314, block motion of the optical device mounting feature 200 back to the deployed configuration until the user again presses on the grip tab 312 to move the stowed configuration latch 208 back to the unlocked position. Thus, the stowed configuration latch 208 may be biased to the locked configuration when the adapter 116 is stowed.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. An adapter for coupling an imaging device to an optical device, the adapter comprising:
   an optical device mounting feature configured to mount the adapter to the optical device;
   an imaging device support surface;
   an imaging device mounting feature configured to mount an imaging device on the imaging device support surface; and
   a pin joint comprising a pin, parallel to the imaging device support surface, about which the optical device mounting feature is rotatable relative to the imaging device support surface, enabling the optical device mounting feature to rotate relative to the imaging device support surface, wherein the pin joint is configured to move the optical device mounting feature between:
      a stowed configuration, in which the optical device mounting feature is positioned alongside the imaging device support surface; and
      a deployed configuration, in which a camera of the imaging device is positionable in alignment with the optical device mounting feature, with the imaging device mounted on the imaging device mounting feature; and
   a deployed configuration latch comprising:
      a recess;
      a protrusion sized to be received in the recess; and
      a slot within which the pin is translatable to translate the protrusion into the recess to retain the optical device mounting feature in the deployed configuration;
   wherein the deployed configuration latch can be actuated between:
      a free position, in which the optical device mounting feature is freely movable from the deployed configuration to the stowed configuration; and
      a locked position, in which the optical device mounting feature is locked in the deployed configuration.

2. The adapter of claim 1, further comprising:
   a positioning mechanism, distinct from the pin joint, that adjustably positions the imaging device mounting feature, relative to the optical device mounting feature, along at least an X-axis parallel to the imaging device support surface;
   and wherein:
   the camera is positionable with the positioning mechanism when in the deployed configuration.

3. The adapter of claim 2, wherein the positioning mechanism can be actuated to move the imaging device along a Y-axis perpendicular to the X-axis and parallel to the imaging device supporting surface.

4. The adapter of claim 3, wherein the positioning mechanism can be further actuated to move the imaging device along a Z-axis perpendicular to the Y-axis and the X-axis.

5. The adapter of claim 3, wherein the positioning mechanism comprises:
   an X-axis rack;
   an X-axis pinion coupled to the X-axis rack such that rotation of the X-axis pinion causes translation of the X-axis rack along the X-axis;
   an X-axis actuation interface coupled to the X-axis pinion such that manual rotation of the X-axis actuation interface causes rotation of the X-axis pinion;
   a Y-axis rack;
   a Y-axis pinion coupled to the Y-axis rack such that rotation of the Y-axis pinion causes translation of the Y-axis rack along the Y-axis; and
   a Y-axis actuation interface coupled to the Y-axis pinion such that manual rotation of the Y-axis actuation interface causes rotation of the Y-axis pinion.

6. The adapter of claim 1, wherein the optical device mounting feature comprises:
   a first arm; and
   a second arm that is translatable relative to the first arm to clamp a portion of the optical device between the first arm and the second arm.

7. The adapter of claim 6, wherein the optical device mounting feature further comprises a threaded shaft coupled to the second arm to urge the second arm to move toward or away from the first arm in response to rotation of the threaded shaft.

8. The adapter of claim 1, further comprising a stowed configuration latch that can be actuated between:
   a free position, in which the optical device mounting feature is freely movable from the stowed configuration to the deployed configuration; and
   a locked position, in which the optical device mounting feature is locked in the stowed configuration.

9. An adapter for coupling an imaging device to an optical device, the adapter comprising:
   an optical device mounting feature configured to mount the adapter to the optical device, the optical device mounting feature comprising:
      a first arm;
      a second arm; and
      a threaded shaft coupled to the second arm to urge the second arm to translate toward the first arm in response to rotation of the threaded shaft to clamp a portion of the optical device between the first arm and the second arm;
   an imaging device support surface;
   an imaging device mounting feature configured to mount an imaging device on the imaging device support surface;
   a pin joint comprising a pin, parallel to the imaging device support surface, about which the optical device mounting feature is rotatable relative to the imaging device support surface, enabling the optical device mounting feature to rotate relative to the imaging device support surface, wherein the pin joint is configured to move the optical device mounting feature between:
      a stowed configuration, in which the optical device mounting feature is positioned alongside the imaging device support surface; and
      a deployed configuration, in which the optical device mounting feature extends beyond a profile of the imaging device support surface; and
   a deployed configuration latch comprising:
      a recess;
      a protrusion sized to be received in the recess; and
      a slot within which the pin is translatable to translate the protrusion into the recess to retain the optical device mounting feature in the deployed configuration;
   wherein the deployed configuration latch can be actuated between:

a free position, in which the optical device mounting feature is freely movable from the deployed configuration to the stowed configuration; and a locked position, in which the optical device mounting feature is locked in the deployed configuration.

10. The adapter of claim 9, wherein the optical device mounting feature comprises:
a first arm;
a second arm; and
a threaded shaft coupled to the second arm to urge the second arm to translate toward the first arm in response to rotation of the threaded shaft to clamp a portion of the optical device between the first arm and the second arm.

11. The adapter of claim 9, further comprising a stowed configuration latch that can be actuated between:
a free position, in which the optical device mounting feature is freely movable from the stowed configuration to the deployed configuration; and
a locked position, in which the optical device mounting feature is locked in the stowed configuration.

12. A method for coupling an imaging device to an optical device with an adapter comprising an optical device mounting feature, an imaging device support surface, an imaging device mounting feature, and a joint, the method comprising:
actuating the joint to rotate the optical device mounting feature from:
a stowed configuration, in which the optical device mounting feature is positioned alongside the imaging device support surface; to
a deployed configuration, in which the optical device mounting feature extends beyond a profile of the imaging device support surface;
with the optical device mounting feature, mounting the adapter to the optical device;
with the imaging device mounting feature, mounting an imaging device to the adapter; and
with the joint in the deployed configuration, aligning the optical device with a camera of the imaging device;
wherein:
the optical device mounting feature comprises:
a first arm;
a second arm; and
a threaded shaft coupled to the second arm; and
the joint comprises a pin, parallel to the imaging device support surface;
the adapter further comprises a deployed configuration latch; and
the deployed configuration latch comprises:
a recess;
a protrusion sized to be received in the recess; and
a slot;
and wherein the method further comprises, after moving the joint to the deployed configuration, actuating the deployed configuration latch from a free position, in which the optical device mounting feature is freely movable from the deployed configuration to the stowed configuration, to a locked position, in which the optical device mounting feature is locked in the deployed configuration, by translating the pin in the slot to translate the protrusion into the recess to retain the optical device mounting feature in the deployed configuration.

13. The method of claim 12, wherein:
the adapter further comprises a stowed configuration latch; and
the method further comprises, prior to moving the joint to the deployed configuration, actuating the stowed configuration latch from:
a locked position, in which the optical device mounting feature is locked in the stowed configuration; to
a free position, in which the optical device mounting feature is freely movable from the stowed configuration to the deployed configuration.

14. The method of claim 12, wherein:
the adapter further comprises a positioning mechanism; and
aligning the optical device with the camera comprises adjusting the imaging device mounting feature, relative to the imaging device support surface, along at least an X-axis parallel to the imaging device support surface.

15. The method of claim 14, wherein aligning the optical device with the camera further comprises adjusting the imaging device mounting feature, relative to the imaging device support surface, along a Y-axis perpendicular to the X-axis and parallel to the imaging device supporting surface.

16. The method of claim 15, wherein:
the positioning mechanism comprises:
an X-axis rack;
an X-axis pinion coupled to the X-axis rack;
an X-axis actuation interface coupled to the X-axis pinion;
a Y-axis rack;
a Y-axis pinion coupled to the Y-axis rack; and
a Y-axis actuation interface coupled to the Y-axis pinion;
adjusting the imaging device mounting feature along the X-axis comprises manually rotating the X-axis actuation interface to cause rotation of the X-axis pinion to cause translation of the X-axis rack along the X-axis; and
adjusting the imaging device mounting feature along the Y-axis comprises manually rotating the Y-axis actuation interface to cause rotation of the Y-axis pinion to cause translation of the Y-axis rack along the Y-axis.

* * * * *